(12) United States Patent
Schleuning et al.

(10) Patent No.: US 11,947,048 B2
(45) Date of Patent: Apr. 2, 2024

(54) CROSSTALK REDUCTION FOR LIGHT DETECTION AND RANGING (LIDAR) DEVICES USING WAVELENGTH LOCKING

(71) Applicant: Waymo LLC, Mountain View, CA (US)

(72) Inventors: David Schleuning, Piedmont, CA (US);
Pierre-Yves Droz, Los Altos, CA (US);
Jason Watson, San Jose, CA (US);
James Dunphy, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 828 days.

(21) Appl. No.: 17/061,003

(22) Filed: Oct. 1, 2020

(65) Prior Publication Data

US 2021/0349185 A1    Nov. 11, 2021

Related U.S. Application Data

(60) Provisional application No. 63/020,615, filed on May 6, 2020.

(51) Int. Cl.
*G01S 7/487*    (2006.01)
*G01S 7/481*    (2006.01)
(Continued)

(52) U.S. Cl.
CPC ............ *G01S 7/487* (2013.01); *G01S 7/4818* (2013.01); *G01S 7/4863* (2013.01); *G01S 17/931* (2020.01)

(58) Field of Classification Search
CPC ...... G01S 7/487; G01S 17/931; G01S 7/4863; G01S 7/4818; G01S 7/4811; G01S 7/4815

(Continued)

(56) References Cited

U.S. PATENT DOCUMENTS 5,335,098 A    8/1994  Leyva et al.
5,377,219 A   12/1994  Geiger
(Continued)

OTHER PUBLICATIONS

"Holographic Volume Bragg Grating Stabilize Laser Diode Performance"; B.L. Volodin, et al.; Photonics Spectra; Nov. 2003.
(Continued)

*Primary Examiner* — Daniel L Murphy
(74) *Attorney, Agent, or Firm* — McDonnell Boehnen Hulbert & Berghoff LLP

(57) ABSTRACT

Example embodiments relate to crosstalk reduction for light detection and ranging (lidar) devices using wavelength locking. An example embodiment includes a lidar device. The lidar device includes a first light emitter configured to emit a first light signal and a second light emitter configured to emit a second light signal. The lidar device also includes a first light guide and a second light guide. In addition, the lidar device includes a first light detector and a second light detector. Further, the lidar device includes a first wavelength-locking mechanism configured to use a portion of the first light signal to maintain a wavelength of the first light signal and a second wavelength-locking mechanism configured to use a portion of the second light signal to maintain a wavelength of the second light signal. The wavelengths of the first light signal and the second light signal are different.

20 Claims, 18 Drawing Sheets

(51) Int. Cl.
    *G01S 7/4863*     (2020.01)
    *G01S 17/931*     (2020.01)

(58) Field of Classification Search
    USPC .................................................. 356/4.01
    See application file for complete search history.

(56) References Cited

U.S. PATENT DOCUMENTS

| | | | |
|---|---|---|---|
| 6,960,486 | B2 | 11/2005 | Mirov et al. |
| 7,427,762 | B2 | 9/2008 | Hyde et al. |
| 7,711,014 | B2 | 5/2010 | Jameson |
| 7,733,922 | B1 | 6/2010 | Munroe |
| 8,515,289 | B2 | 8/2013 | Maxik et al. |
| 8,541,744 | B1 | 9/2013 | Liu |
| 9,001,862 | B2 | 4/2015 | Ushinsky et al. |
| 9,270,085 | B1 | 2/2016 | Kanskar |
| 10,033,996 | B2 * | 7/2018 | Zalevsky ............. H04N 13/218 |
| 10,338,220 | B1 | 7/2019 | Raring et al. |
| 10,591,600 | B2 | 3/2020 | Villeneuve et al. |
| 2010/0277714 | A1 | 11/2010 | Pedersen et al. |
| 2015/0301178 | A1 | 10/2015 | Brinkmeyer et al. |
| 2018/0031678 | A1 * | 2/2018 | Singer ................... G01S 17/931 |
| 2019/0072649 | A1 | 3/2019 | Droz et al. |
| 2019/0129206 | A1 | 5/2019 | Lee et al. |
| 2019/0239753 | A1 | 8/2019 | Wentz |
| 2020/0041614 | A1 | 2/2020 | Donovan et al. |
| 2020/0076152 | A1 | 3/2020 | Eichenholz et al. |

OTHER PUBLICATIONS

"RP Photonics Encyclopedia—Volume Bragg Gratings"; retrieved from URL: https://www.rp-photonics.com/volume_bragg_gratings.html; retrieved on Apr. 7, 2020.

"RP Photonics Encyclopedia—Bragg Mirrors"; retrieved from URL: https://www.rp-photonics.com/bragg_mirrors.html; retrieved on Apr. 7, 2020.

"RP Photonics Encyclopedia—Distributed Bragg Reflector Lasers"; retrieved from URL: https://www.rp-photonics.com/distributed_bragg_reflector_lasers.html; retrieved on Apr. 7, 2020.

"High-power 1.5μm Laser Diodes for LIDAR Applications"; Jukka Viheriala, et al.; IEEE High Power Diode Lasers and Systems Conference 2019; 2019.

"Wavelength-Stabilized High-Pulse-Power Laser Diodes for Automotive LiDAR"; Andrea Knigge, et al.; Jan. 2018.

International Search Report and Written Opinion dated Aug. 20, 2021 issued in connection with International Patent Application No. PCT/US2021/030892, filed on May 5, 2021.

* cited by examiner

CROSSTALK REDUCTION FOR LIGHT DETECTION AND RANGING (LIDAR) DEVICES USING WAVELENGTH LOCKING

CROSS-REFERENCE TO RELATED APPLICATIONS

The present application claims priority to Provisional Patent Application No. 63/020,615, filed with the U.S. Patent and Trademark Office on May 6, 2020, the contents of which are hereby incorporated by reference.

BACKGROUND

Light detection and ranging (lidar) devices may estimate distances to objects in a given environment. For example, a light emitter of a lidar device may emit a near-infrared light signal, which may interact with objects in the lidar device's environment. At least a portion of the light signal may be redirected back toward the lidar device (e.g., due to reflection or scattering) and detected by a light detector. Some light detectors may include a corresponding controller configured to determine an arrival time of respective light pulses with high temporal resolution (e.g., ~400 ps). The distance between the lidar device and a given object may be determined based on a time of flight of the corresponding light signal that interacts with the given object.

SUMMARY

Example embodiments relate to crosstalk reduction for lidar devices. In some lidar devices, light emitters and/or light detectors may be positioned near one another within a lidar device. As such, one detection channel may be susceptible to interference from an adjacent detection channel. Such interference may result in inaccurate measurements. As such, embodiments herein establish separate wavelengths for light signals in adjacent channels. For example, light emitters in adjacent channels may each use wavelength-locking techniques to lock the emitted signals of the respective light emitters to different wavelengths. Further, the light detectors in adjacent channels may be correspondingly tuned to different wavelengths. In addition, the light detectors may have narrow detection bands (e.g., based on one or more associated optical filters). As a result, wavelengths corresponding to light signals in adjacent channels may not be detected, thereby eliminating crosstalk.

In one aspect, a light detection and ranging (lidar) device is provided. The lidar device includes a first light emitter configured to emit a first light signal. The lidar device also includes a second light emitter configured to emit a second light signal. In addition, the lidar device includes a first light guide optically coupled to the first light emitter and configured to guide the first light signal toward an environment surrounding the lidar device. Further, the lidar device includes a second light guide optically coupled to the second light emitter and configured to guide the second light signal toward the environment surrounding the lidar device. Additionally, the lidar device includes a first light detector positioned to receive the first light signal upon the first light signal being reflected by a first object in the environment surrounding the lidar device. Still further, the lidar device includes a second light detector positioned to receive the second light signal upon the second light signal being reflected by a second object in the environment surrounding the lidar device. Yet further, the lidar device includes a first wavelength-locking mechanism configured to use a portion of the first light signal to maintain a wavelength of the first light signal. Even further, the lidar device includes a second wavelength-locking mechanism configured to use a portion of the second light signal to maintain a wavelength of the second light signal. The wavelength of the first light signal and the wavelength of the second light signal are different from one another.

In an additional aspect, a method is provided. The method includes emitting, from a first light emitter of a light detection and ranging (lidar) device, a first light signal. The method also includes emitting, from a second light emitter of the lidar device, a second lidar signal. In addition, the method includes guiding, by a first light guide optically coupled to the first light emitter, the first light signal toward an environment surrounding the lidar device. Further, the method includes guiding, by a second light guide optically coupled to the second light emitter, the second light signal toward the environment surrounding the lidar device. Additionally, the method includes maintaining, by a first wavelength-locking mechanism using a portion of the first light signal, a wavelength of the first light signal. Still further, the method includes maintaining, by a second wavelength-locking mechanism using a portion of the second light signal, a wavelength of the second light signal. The wavelength of the first light signal and the wavelength of the second light signal are different from one another. Even further, the method includes receiving, by a first light detector, the first light signal upon the first light signal being reflected by a first object in the environment surrounding the lidar device. Yet still further, the method includes receiving, by a second light detector, the second light signal upon the second light signal being reflected by a second object in the environment surrounding the lidar device.

In yet another aspect, a method of manufacturing a light detection and ranging (lidar) device is provided. The method includes attaching a first light emitter to a substrate. The first light emitter is configured to emit a first light signal. The method also includes attaching a second light emitter to the substrate. The second light emitter is configured to emit a second light signal. In addition, the method includes aligning a first light guide to the first light emitter on the substrate. The first light guide is configured to guide the first light signal toward an environment surrounding the lidar device. Further, the method includes aligning a second light guide to the second light emitter on the substrate. The second light guide is configured to guide the second light signal toward the environment surrounding the lidar device. Additionally, the method includes positioning a first light detector to receive the first light signal upon the first light signal being reflected by a first object in the environment surrounding the lidar device. Yet further, the method includes positioning a second light detector to receive the second light signal upon the second light signal being reflected by a second object in the environment surrounding the lidar device. Even further, the method includes defining, adjacent to the first light emitter or the first light guide or within the first light guide, a first wavelength-locking mechanism. The first wavelength-locking mechanism is configured to use a portion of the first light signal to maintain a wavelength of the first light signal. Still yet further, the method includes defining, adjacent to the second light emitter or the second light guide or within the second light guide, a second wavelength-locking mechanism. The second wavelength-locking mechanism is configured to use a portion of the second light signal to maintain a wavelength of the second light signal. The wavelength of the first light signal and the wavelength of the second light signal are different from one another.

These as well as other aspects, advantages, and alternatives will become apparent to those of ordinary skill in the art by reading the following detailed description, with reference, where appropriate, to the accompanying drawings.

DETAILED DESCRIPTION

Figure 1:
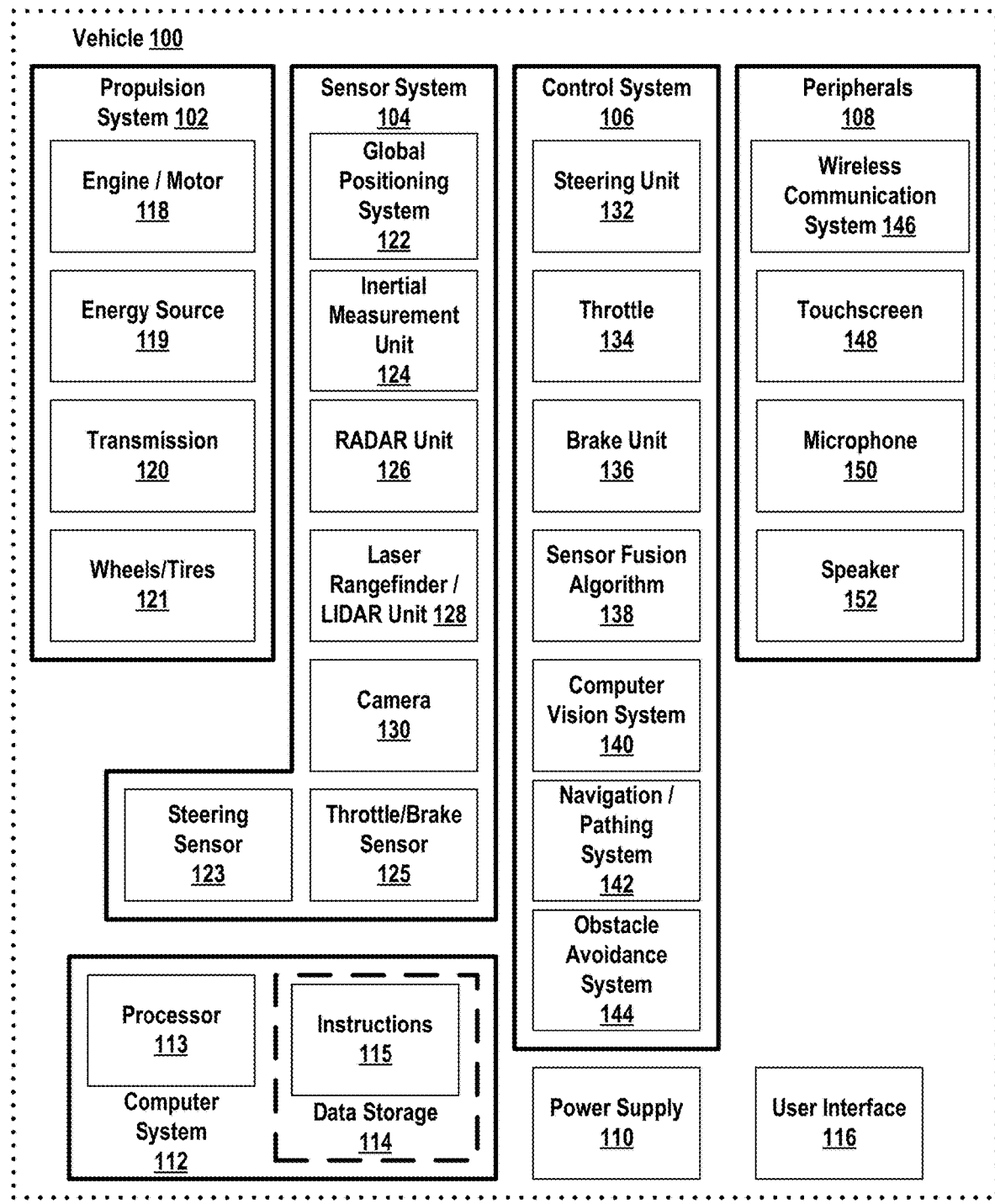
FIG. 1 is a functional block diagram illustrating a vehicle, according to example embodiments.
Figure 2A:
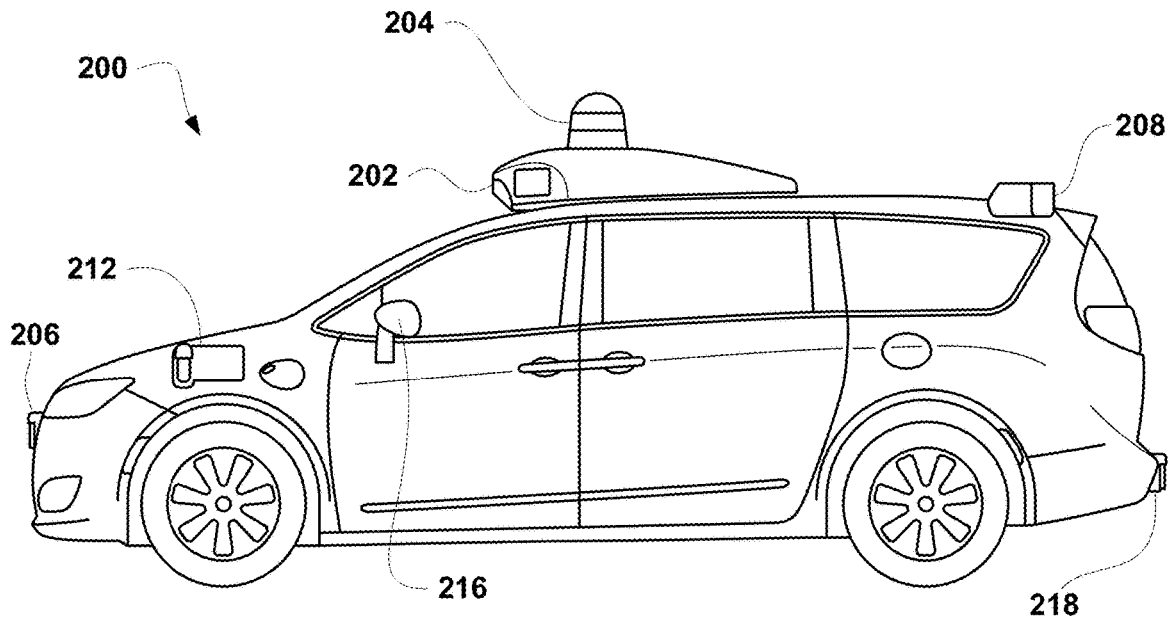
FIG. 2A is an illustration of a physical configuration of a vehicle, according to example embodiments.
Figure 2B:
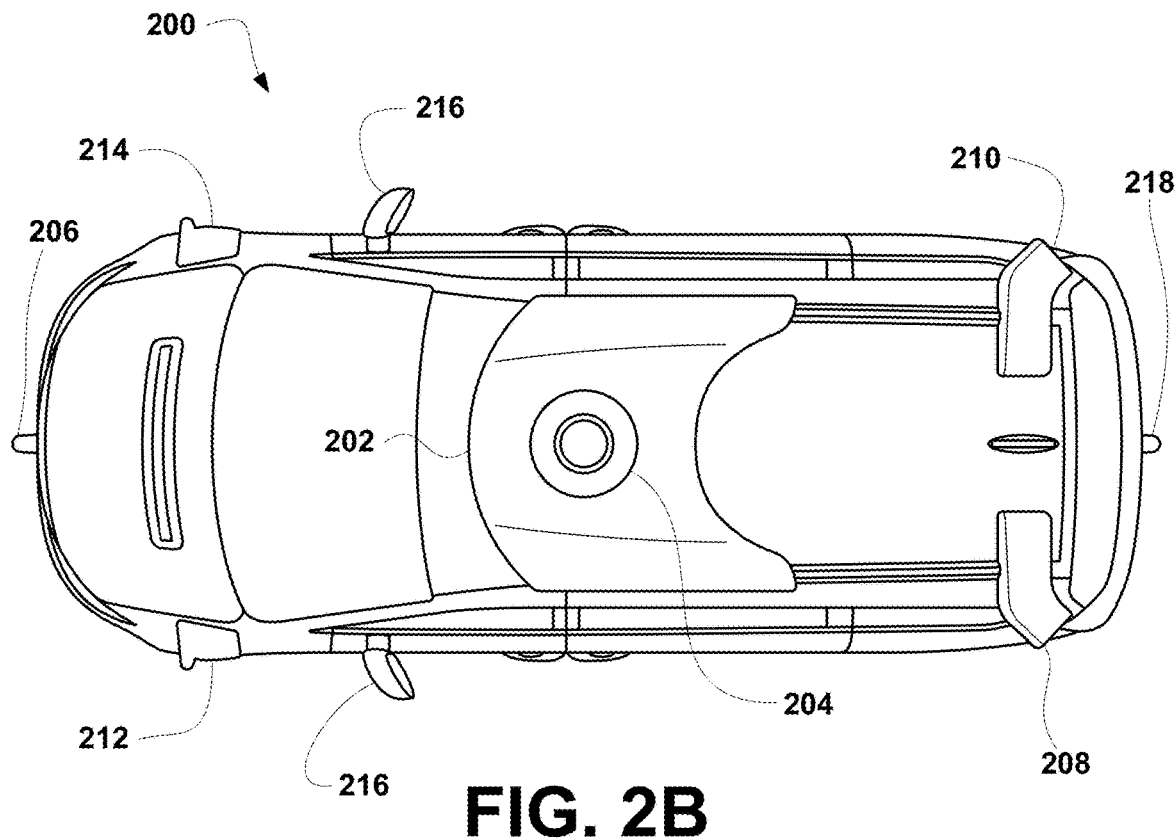
FIG. 2B is an illustration of a physical configuration of a vehicle, according to example embodiments.
Figure 2C:
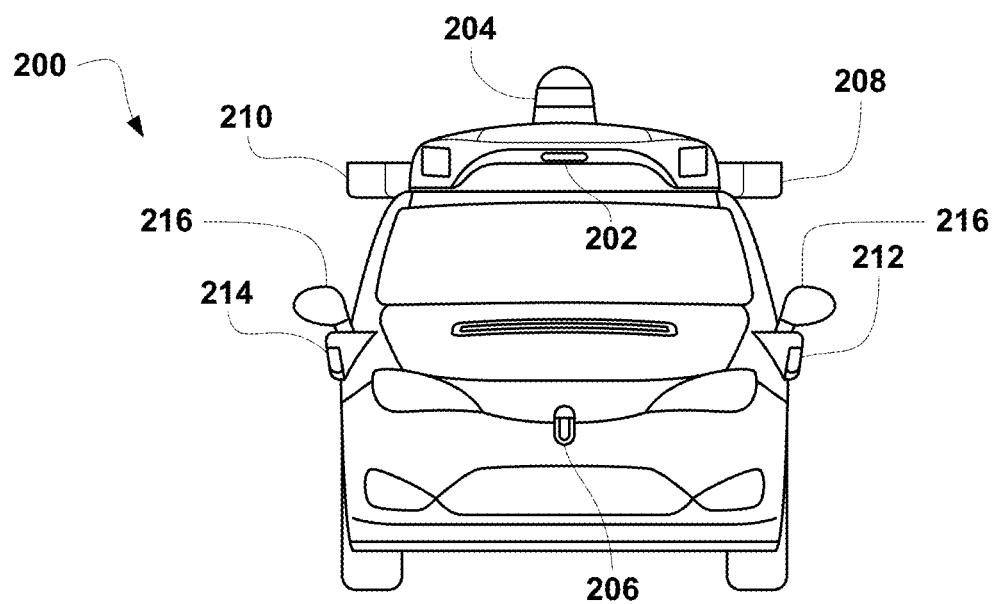
FIG. 2C is an illustration of a physical configuration of a vehicle, according to example embodiments.
Figure 2D:
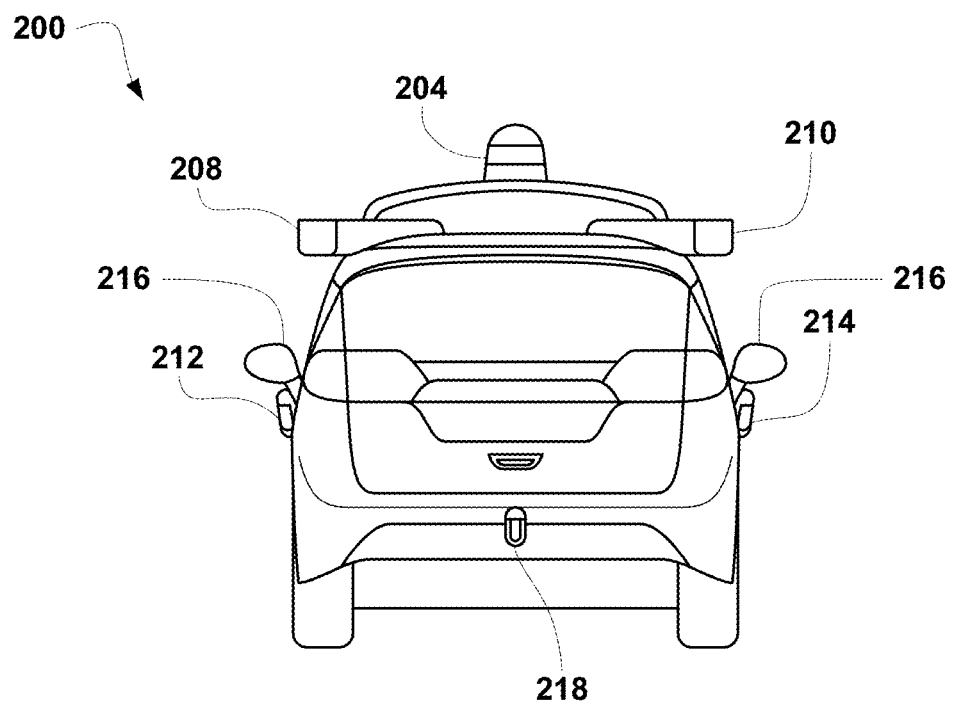
FIG. 2D is an illustration of a physical configuration of a vehicle, according to example embodiments.
Figure 2E:
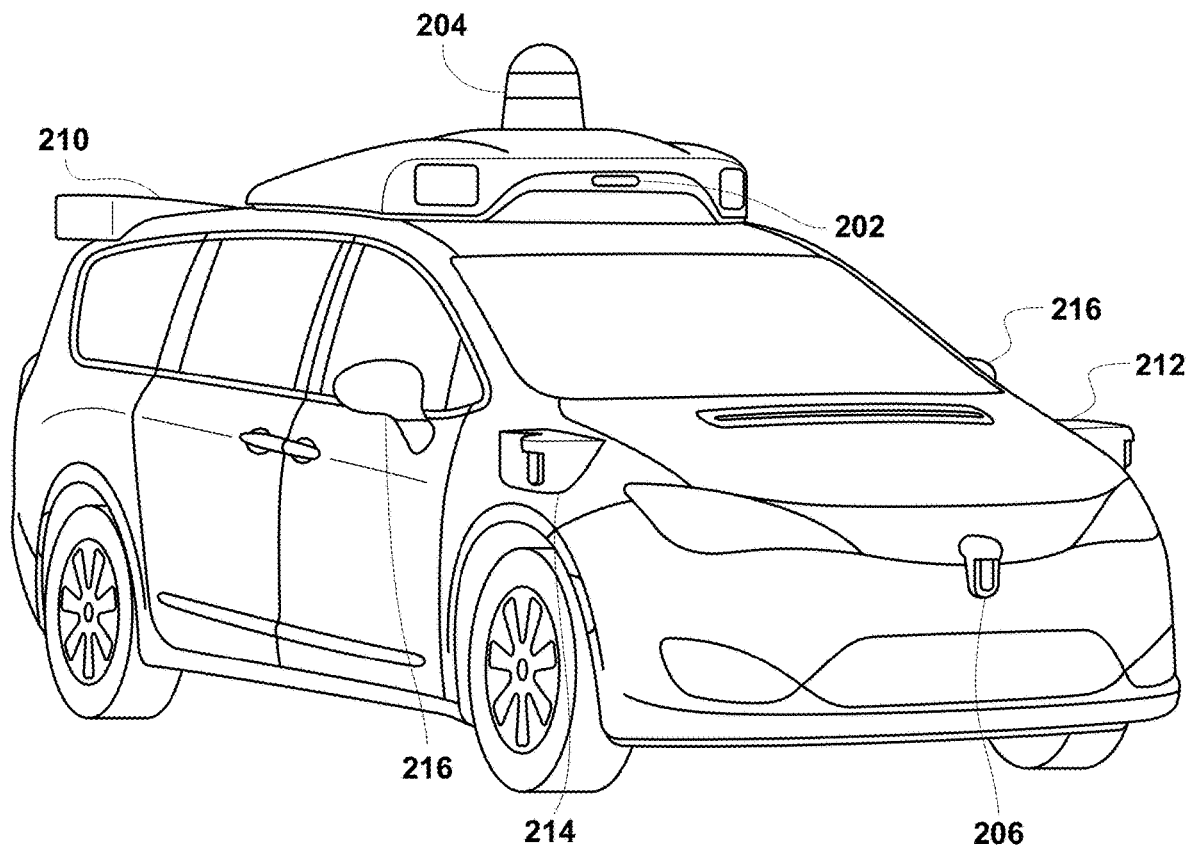
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. OVERVIEW

Embodiments disclosed herein may include lidar devices. In some embodiments, the lidar devices may include one or more light emitters. The light emitters may include laser diodes configured to generate light signals. Laser diodes may emit light within a range of wavelengths (e.g., with a center wavelength within the near-infrared spectrum, such as 905 nm or 1550 nm). Many light emitters, though, have temperature-dependent outputs. In some cases, for instance, the range of wavelengths of the emitted light signal may change based on temperature (e.g., shifts in temperature may alter a gain medium present within the laser of the light emitter). For example, the output of a laser diode may shift by about 0.3 nm/° C.

Such temperature-dependencies may be undesirable. For example, a wavelength-specific chromatic filter that corresponds to the emission wavelength may be used on a receive side of the lidar device. Such a filter may filter out wavelengths other than those emitted by the light emitter in order to eliminate noise. However, if the wavelength of the light emitter shifts, the passband of the filter would either need to shift along with the output wavelength of the light emitter or the passband of the filter would need to be wide enough to accommodate a range of emission wavelengths based on a corresponding range of possible operating temperatures. Having a filter with an adjustable passband could be unduly complicated or expensive. Alternatively, having a filter with a wider passband could degrade performance of the lidar device by permitting additional detection noise. As such, it can be beneficial to reduce or eliminate the temperature-dependency of the wavelength of the light signal emitted by the light emitter. Reducing the temperature-dependency may mitigate the root cause of the problem, which may result in a higher power efficiency for the lidar device when compared with methods that simply attempt to maintain a stable temperature of the light emitter (e.g., using a thermoelectric cooler). For similar reasons, it may be beneficial to narrow the emission bandwidth of the light emitter in addition to or instead of reducing or eliminating temperature-dependency of the light emitter. Further, it may also be beneficial to reduce the current density and stress of the light emitter and mitigate feedback from other components or sources. Techniques for reducing emission bandwidth are described herein, as well.

Disclosed herein are techniques for reducing the temperature-dependency of light signals emitted by a light emitter in a lidar system. Some techniques described herein include providing a feedback light signal to the light emitter (e.g., some techniques described herein include mechanisms for wavelength-locking the light emitter that are external to the light emitter, itself). The feedback light signal may be a portion of the light signal emitted by the light emitter that is reflected (e.g., internally within the lidar device) toward the light emitter. The feedback light signal may be relatively narrowband (e.g., may have a bandwidth of 0.1 nm, 0.2 nm, 0.3 nm, 0.4 nm, 0.5 nm, 0.6 nm, 0.7 nm, 0.8 nm, 0.9 nm, 1.0 nm, 1.1 nm, 1.2 nm, 1.3 nm, 1.4 nm, 1.5 nm, 1.6 nm, 1.7 nm, 1.8 nm, 1.9 nm, 2.0 nm, 2.1 nm, 2.2 nm, 2.3 nm, 2.4 nm, 2.5 nm, 2.6 nm, 2.7 nm, 2.8 nm, or 2.9 nm) when compared with the bandwidth of the light emitter without a temperature-dependence mitigation technique employed (e.g., a bandwidth between 3.0 nm and 6.0 nm). Further, the feedback light signal may have qualities based on the temperature-dependence mitigation technique used and may be relatively temperature independent.

In embodiments where the light emitter is a laser device (e.g., a laser diode), the feedback light signal may interact with the gain medium of the light emitter and provide a seeding light signal that stimulates emission of further radiation. As such, the light emitter may be induced to lase based on the feedback light signal. This would cause the additional light produced by the light emitter to exhibit the same narrow bandwidth and relative temperature independence of the feedback light signal.

In some embodiments, the lidar device may include a light guide optically coupled to the light emitter. The light guide may direct light emitted by the light emitter toward the environment surrounding the lidar device. The light guide and/or light emitter may be positioned on a substrate within the lidar device, for example. Further, the lidar device may include a transparent substrate. A light detector may be positioned to receive light returning from the surrounding environment via an aperture in an aperture plate. The light detector may comprises a wavelength-selective light detector. Additionally, in some embodiments, an output end of the light guide may be positioned adjacent to the aperture (e.g., which may result in a transmit location of the lidar device coinciding with a receive location of the lidar device).

Possible techniques of reducing or eliminating the temperature-dependent nature of the light signal emitted by the light emitter and/or narrowing the emission bandwidth of the light emitter may include: a dye within the light guide, a quantum-dot material within the light guide, a volume Bragg grating within the light guide, a distributed Bragg reflector within the light guide, a volume Bragg grating positioned at an end of the light guide adjacent to both the light guide and the light detector, and an optical filter positioned at an end of the light guide opposite an end at which the light emitter is positioned. Such techniques may be used individually or in tandem.

As noted above, a dye or a quantum-dot material may be located within the light guide. The dye or quantum-dot material may be implanted into the light guide, for example, and may absorb wavelengths outside of a given passband. Further, the dye or quantum-dot material may redirect some of the non-absorbed wavelengths back toward the light emitter to provide feedback for maintaining narrowband emissions and reduced temperature-dependency. In some embodiments, a mirror (e.g., an angled portion of a light guide located at an end of the light guide or a free-space mirror) may redirect unabsorbed light (the feedback signal) back toward the light emitter.

Another technique may involve a volume Bragg grating and/or a distributed Bragg reflector being positioned within the light guide. For example, the light guide may be cleaved at a center portion and a volume Bragg grating may be inserted in the center portion between the cleaved ends of the light guide. Alternatively, a distributed Bragg reflector may be written into the light guide during fabrication. For example, the light guide may have the distributed Bragg reflector imprinted into it or lithography may be used to define a distributed Bragg reflector within the light guide. Alternatively, a mask used to fabricate the light guide may include a portion that results in a slot in the middle of the light guide (e.g., between 5 µm and 15 µm in length). Such a slot could be filled with a viscous liquid (e.g., a photo-sensitive viscous liquid used in holography). Such a viscous liquid could then be exposed to a laser used to write a grating into the viscous liquid and then the liquid may be allowed to cure, thus resulting in the distributed Bragg reflector. The period of the distributed Bragg reflector may select for a specific wavelength or band of wavelengths. Further, in embodiments having volume Bragg gratings, the volume Bragg gratings may be active or passive. Active volume Bragg gratings may allow for enhanced temperature control (e.g., by modulating the period of the volume Bragg grating or modulating some other geometry of the volume Bragg grating with changing temperature to counteract thermal expansion and/or to account for changes in the light emitter). In some embodiments, volume Bragg gratings and/or distributed Bragg reflectors may be positioned at an output end of the light guide. In such embodiments, volume Bragg gratings and/or distributed Bragg reflectors may also be positioned close to the light detector. In some embodiments, a mirror (e.g., an angled portion of a light guide located at an end of the light guide or a free-space mirror) may redirect light from a volume Bragg grating and/or a distributed Bragg reflector back toward the light emitter (e.g., a feedback signal may be provided to the light emitter).

As used herein, the term "volume Bragg grating" is used to define a diffraction grating (e.g., defined within a photo-sensitive material) having a periodic variation in refractive index that is holographically recorded (e.g., by imposing interference between a predetermined input wavefront and output wavefront on a photosensitive material, such as photosensitive glass). Volume Bragg gratings may be alternatively referred to as "bulk Bragg gratings" or "volume holographic gratings," in some contexts. Such a volume Bragg grating may have a periodic variation of refractive index (e.g., between 1 nm and 1 µm) used to reflect a bandwidth of incoming light (e.g., a bandwidth of 0.001 nm, 0.01 nm, or 0.1 nm). Certain geometric characteristics of the volume Bragg grating can also be used to define reflectivity, reflection spectrum, accepted beam size/shape, absorption, scattering, etc. Further, in some embodiments, volume Bragg gratings may be chirped such that the reflected wavelengths are not constant over the entire volume of the grating.

Also as used herein, the term "distributed Bragg reflector" refers to a periodic structure of alternating layers having two or more different refractive indices (e.g., a corrugated waveguide). Distributed Bragg reflectors may be a type of quarter-wave Bragg mirror, for example. The refractive-index contrast between adjacent layers in distributed Bragg reflectors may be less than the refractive-index contrast between adjacent portions of volume Bragg gratings. As such, the length of the distributed Bragg reflector may be greater than the length of the volume Bragg grating to permit additional interaction length for the light signal. Conversely, the periodicity of the volume Bragg gratings may be less well-defined than that of the distributed Bragg reflectors, given the difference in fabrication techniques used. Similar to volume Bragg gratings, distributed Bragg reflectors may reflect a bandwidth of incoming light. Also similar to volume Bragg gratings, distributed Bragg reflectors can define reflectivity, reflection spectrum, accepted beam size/shape, absorption, scattering, etc. In some cases, distributed Bragg reflectors may be used for filtering/reflecting single-mode light beams, whereas volume Bragg gratings may be used for filtering/reflecting multimode light beams. Like volume Bragg gratings, distributed Bragg reflectors may also be chirped such that the reflected wavelengths are not constant over the entire volume of the reflector.

In some embodiments, an optical filter may be used to provide wavelength locking. The optical filter may absorb wavelengths outside of the narrow band of wavelengths being selected for transmission. Light having a wavelength within the narrow band may be partially transmitted to a surrounding environment for detection and/or partially redirected toward the light emitter to reduce wavelength dependence of the light emitter and/or to produce a narrow band output. In some embodiments, a mirror (e.g., an angled portion of a light guide located at an end of the light guide or a free-space mirror) may redirect the unabsorbed light (the feedback signal) back toward the light emitter. Further, the optical filter may be positioned at an output end of the light guide, for example. In some embodiments, for example, the optical filter may coat the entire substrate (e.g., wafer) on which the light guide and the light emitter are positioned.

Still further, in some embodiments, lidar devices may include an array of light emitters and a corresponding array of light detectors (e.g., wavelength-selective light detectors). In such embodiments, there may also be a corresponding array of light guides (e.g., one light guide for each light emitter) and/or a corresponding array of apertures (e.g., one aperture for each wavelength-selective light detector). The sets of light emitters, light guides, apertures, and/or wavelength-selective light detectors may all be positioned adjacent to one another (e.g., within transmit channels and receive channels). As such, adjacent transmit/receive channels may be positioned in proximity to one another. Thus, such channels may be susceptible to crosstalk (i.e., when a signal from one channel improperly influences the detection in one or more adjacent channels). To ensure detection accuracy, it may be desirable to reduce or eliminate such crosstalk. The wavelength-locking techniques herein may also be used to reduce crosstalk. For example, adjacent light guides may each have their own respective volume Bragg grating (or their own respective sections of a single, wider volume Bragg grating). As such, adjacent light guides may have volume Bragg gratings with slightly different periods. Because of this, the emission band for light emitters in adjacent channels may be slightly different. Hence, by using a filter on the wavelength-selective light detector that selects for only a narrow band of wavelengths, light from adjacent channels could be filtered out, thereby reducing or removing the influence of adjacent light signals on detection. This provides a way to isolate adjacent channels in addition to reducing temperature-dependency and providing narrower band emissions. Similar techniques for channel isolation could be used with distributed Bragg reflectors (e.g., by varying the period of or the refractive index composition of adjacent distributed Bragg reflectors), optical filters (e.g., by slightly varying the absorption/transmission band of adjacent optical filters), dyes, and/or quantum-dot materials (e.g., by slightly varying the absorption band of dyes and/or quantum-dot materials in adjacent light guides).

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors (e.g., avalanche photodiodes (APDs)). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
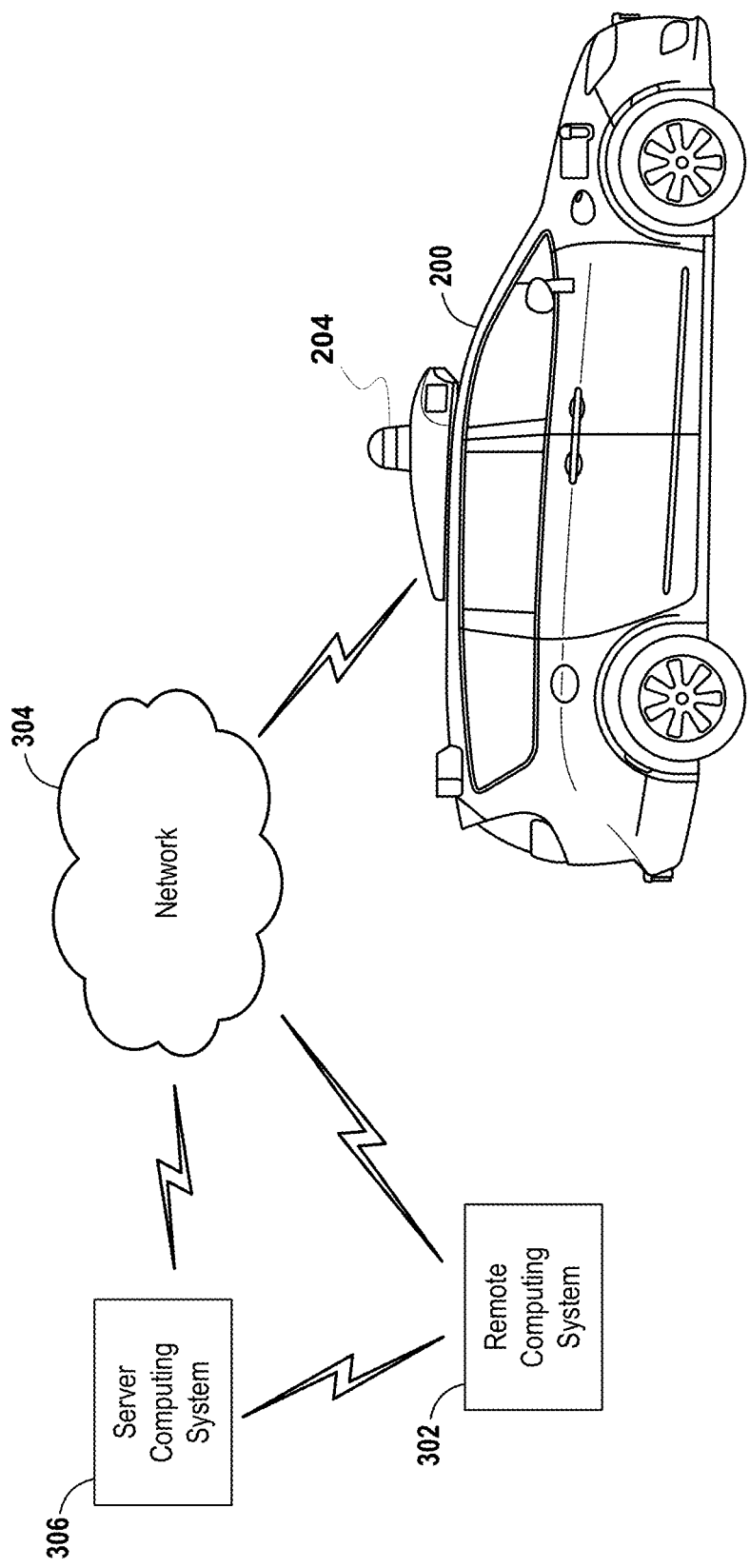
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
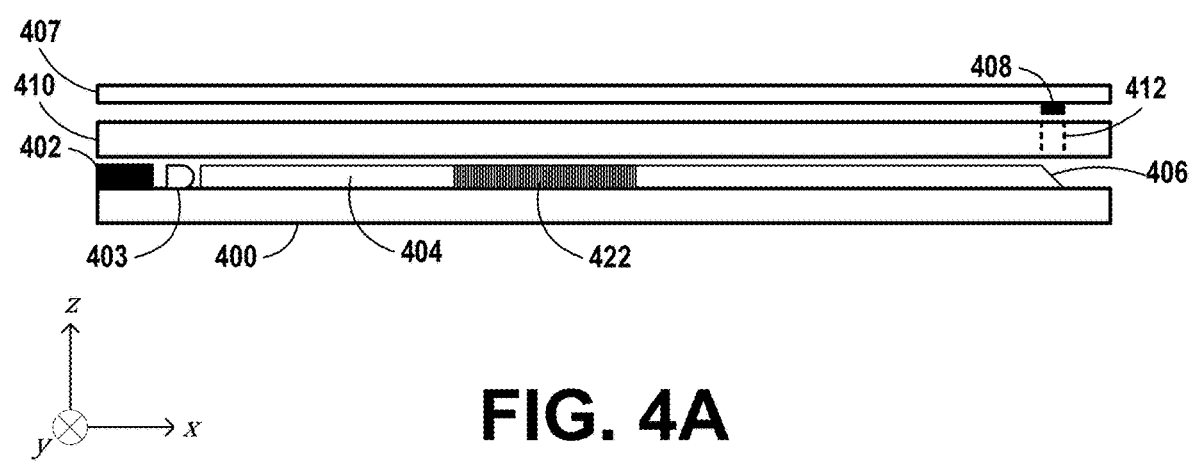
FIG. 4A is a side-view illustration of a lidar device, according to example embodiments.

FIG. 4A is a side-view illustration (e.g., along the y-axis, as illustrated) of a lidar device, according to example embodiments. The lidar device may include a wavelength-locking mechanism (e.g., a distributed Bragg reflector 422, as illustrated). The lidar device may also include a substrate 400 (e.g., a transparent substrate), a light emitter 402 (e.g., a laser diode), a fast-axis collimator (FAC) lens 403, a light guide 404 with an angled portion 406 at one end, a wavelength-selective light detector 408 on a detector substrate 407, and an aperture plate 410 with an aperture 412 defined therein (illustrated with a dashed line). The angled portion may act as a mirror that partly directs light up downward through the substrate 400 toward the surrounding environment while letting some light returning from the environment pass through and/or around the angled portion 406 and the substrate 400 to be detected by the wavelength-selective light detector 408. Further, as illustrated, the wavelength-selective light detector 408 may be positioned to receive a light signal upon the light signal being reflected by an object in the environment surrounding the lidar device, returning the lidar device, and traveling through the aperture 412.

Figure 4B:
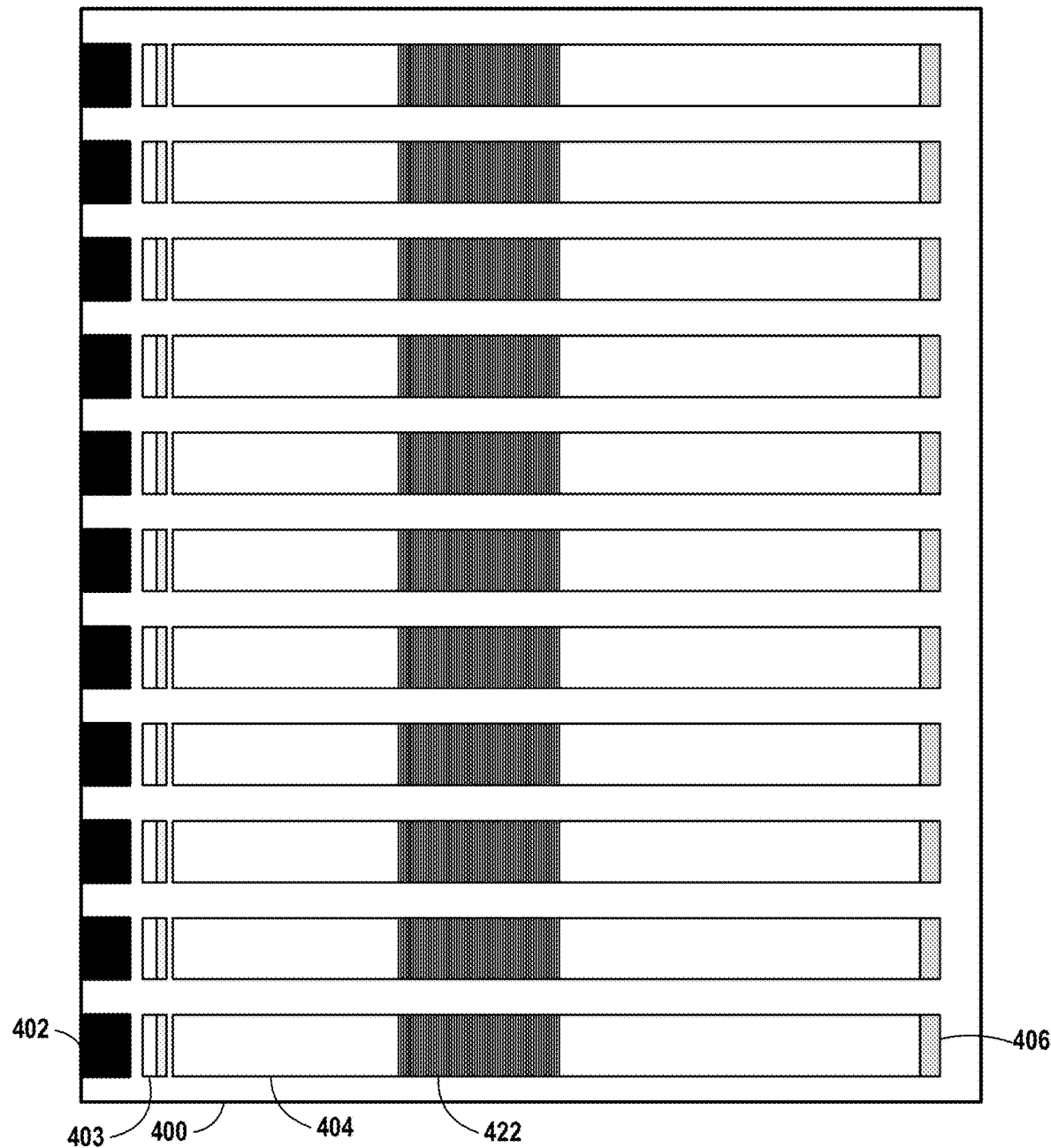
FIG. 4B is a top-view illustration of a lidar device, according to example embodiments.

FIG. 4B illustrates the same device as FIG. 4A, but from a top view (i.e., along the positive z-axis) and with the aperture plate 410 and the wavelength-selective light detector 408/detector substrate 407 removed for the purposes of illustration (e.g., so they do not occlude the substrate 400 and other components in the drawing). As illustrated in FIG. 4B, the lidar device may contain multiple sets of light emitters 402, FAC lenses 403, and light guides 404 on the same substrate 400. While not illustrated, there may also be a corresponding number of wavelength-selective light detectors 408 on the detector substrate 407.

The light emitter 402 may include a light source such as a laser diode. In some embodiments, the light emitter 402 may include a pulsed light source. For example, the light source may include a pulsed laser (e.g., a Q-switched laser). In alternate embodiments, a continuous wave (CW) light source may be used. In some embodiments, the light emitter 402 may include a fiber laser coupled to an optical amplifier. In particular, the fiber laser may be a laser in which an active gain medium (i.e., source of optical gain within the laser) is in an optical fiber. Moreover, the fiber laser could be arranged in various ways within the lidar device (e.g., partially disposed on the substrate 400 or entirely disposed on the substrate 400). In still other embodiments, however, the light emitter 402 may include a light emitting diode (LED), a vertical cavity surface emitting laser (VCSEL), an organic light emitting diode (OLED), a polymer light emitting diode (PLED), a light-emitting polymer (LEP), a liquid crystal displays (LCD), microelectromechanical systems (MEMS), and/or any other device configured to selectively transmit, reflect, and/or emit light to provide emitted light beams and/or pulses. The light emitter 402 may be configured to emit light signals toward objects in a surrounding environment that, when reflected by such objects, can be detected by the wavelength-selective light detector 408 to determine a distance between the lidar device and the respective object and/or a reflectivity of the respective object.

The wavelength range emitted by the light emitter 402 could, for example, be in the ultraviolet, visible, and/or infrared portions of the electromagnetic spectrum. In some examples, the wavelength range can be a relatively narrow wavelength range, such as is provided by lasers. In some embodiments, the wavelength range includes wavelengths that are approximately 905 nm, for example. It is noted that this wavelength is provided only as an example and is not meant to be limiting. Further, the wavelength range emitted by the light emitter 402 (e.g., when unmodified by a wavelength-locking mechanism) may vary with temperature. For example, in some embodiments, the center wavelength of the wavelength range emitted by the light emitter 402 may vary by approximately 0.3 nm/° C.

Light signals (e.g., light pulses) emitted by the light emitter 402 may be coupled into the corresponding light guide 404 (e.g., via the FAC lens 403). The FAC lens 403 may collimate the emitted light signals along a fast-axis of divergence in order to prevent losing energy that would otherwise be lost if the light signal diverged beyond the bounds of the light guide 404 before reaching the light guide 404. In other words, the FAC lens 403 may be used to confine the light signal emitted by the light emitter 402 along at least one direction. The FAC lens 403 may be an astigmatic lens (e.g., a cylindrical lens), in some embodiments. Additionally or alternatively, light signals emitted by the light emitter 402 may be redirected, focused, collimated, filtered, and/or otherwise adjusted prior to being coupled into the light guide 404. In alternate embodiments, coupling the light signal into the light guide 404 may include directly abutting the light guide 404 to the emission surface of the light emitter 402. Alternatively, coupling light from the light emitter 402 into the light guide 404 may be accomplished by one or more additional coupling optics (e.g., free space optics) between the light emitter 402 and the light guide 404.

The light guide 404 may receive light signals emitted by the light emitter 402. After receiving light signals, the light guide 404 may propagate the respective light signal from one end of the respective light guide 404 to the other end. In some embodiments, the light guide 404 may include an optical waveguide (e.g., an optical fiber). Such an optical waveguide may be fabricated from materials (e.g., photoresist, epoxy, etc.) that have higher refractive indices than the surrounding medium (e.g., air, vacuum, etc.) within the lidar device. Thus, the light signals may propagate from one end of the light guide 404 to the other by total internal reflection. In other words, when a light signal interacts with the interface between the light guide 404 and the surrounding medium, the light signal may be reflected internally so long as the angle of incidence is less than the critical angle (e.g., which may be based on a ratio of the respective indices of refraction of the light guide 404 compared to the surrounding medium).

Based on the propagation described above, at least a portion of the light signal coupled into a first end of the light guide 404 may reach an opposite, output end of the light guide 404. An angled portion 406 may be located at the output end of the light guide 404. The angled portion 406 may have various angles relative to the direction of propagation within the light guide 404 (e.g., 15°, 30°, 45°, 60°, or 75°). The angled portion 406 may include a reflective material thereon. Based on the angle, a portion of the respective light signal may be directed in the negative z-direction (e.g., downward, as illustrated in FIG. 4A). The light signal may then pass through the substrate 400 and out of the lidar device to the surrounding environment.

In some embodiments, the substrate 400 may be partially or wholly transparent and/or partially or wholly translucent below the output ends of the light guide 404. This may allow light signals being transmitted to or returning from the environment to pass through and/or around the output ends of the light guide 404 and the substrate 400 and be directed to the surrounding environment (on the transmit side) or detected by the wavelength-selective light detector 408 (on the receive side). In other embodiments, the substrate 400 may have holes defined therein below the output ends of the light guide 404, again allowing light signals being transmitted to or returning from the environment to pass through and/or around the output ends of the light guide 404 and the substrate 400 and to be directed to the surrounding environment (on the transmit side) or detected by the wavelength-selective light detector 408 (on the receive side).

In some embodiments, the angled portions 406 may include one or more mirrors (e.g., aluminum-glass mirror or silver-glass mirror) positioned at the end of the light guide 404. Such mirrors may also be positioned at an angle relative to the propagation direction of the light signals within the light guide 404 so as to direct the light signals out of the light guide 404 and toward the surrounding environment.

It is understood that the light guide 404 could take a different shape than is illustrated in FIGS. 4A and 4B (which are provided solely as an example). The light guides 404 could be straight (as illustrated), while other embodiments may have s-shaped or otherwise curved (e.g., arcs) light guides 404. Any shape of the light guide 404 is possible, so long as at least a portion of the light signal emitted by the respective light emitter 402 can propagate through the light guide 404 and, ultimately, out of the lidar device. Further, some embodiments could include different numbers of light guides 404 and/or light emitters 402 than are illustrated in FIGS. 4A and 4B.

The light emitter 402 may be powered by and/or controlled by a firing circuit. The firing circuit may be connected to the light emitter 402 by one or more conductive traces defined in the substrate 400, for example. In some embodiments, the firing circuit may include one or more capacitors. Such capacitors may be charged by one or more power supplies. Then, to cause the light emitter 402 to emit a light signal (i.e., to "fire"), the stored energy in the capacitors may be discharged through the light emitter 402. In some embodiments, the firing circuit may cause the light emitter 402 to emit a light signal simultaneously with other light emitters in the light device. In other embodiments, the firing circuit may cause the light emitters within the lidar device to emit light signals sequentially. Other firing patterns (including random and pseudo-random firing patterns) are also possible and contemplated herein.

In some embodiments, the firing circuit may be controlled by a controller (e.g., a microprocessor configured to execute instructions stored on a non-transitory, computer-readable medium). The controller may selectively fire the light emitter 402 using the firing circuit via firing-control signals (e.g., according to a predefined pattern). In some embodiments, the controller may also be configured to control other functions of the lidar device. For example, the controller may control the movement of one or more movable stages associated with the lidar device and/or generate a point-cloud representation of the environment surrounding the lidar device based on received electronic signals from the wavelength-selective light detector 408 in the lidar device that correspond to detected light signals reflected from objects in the environment. Generating the point-cloud representation may be done based on the intensity of the detected signal compared to the intensity of an emitted signal and/or based on the timing of the detected signal compared to the timing of an emitted signal, in various embodiments. In alternate embodiments, data about detected light signals and/or emitted light signals (e.g., timing data or intensity data) may be transmitted to a separate computing device (e.g., a remotely located server computing device or an on-board vehicle controller). The separate computing device may be configured to generate the point-cloud representation (e.g., and store the point-cloud representation in a memory and/or transmit the point-cloud representation to a lidar controller).

The wavelength-selective light detector 408 may include one or more various types of detectors (e.g., single-photon detectors). For example, the wavelength-selective light detector 408 may include SPADs and/or SiPMs. SPADs may employ avalanche breakdown within a reverse-biased p-n junction (i.e., diode) to increase an output current for a given incident illumination on the SPAD. Further, SPADs may be able to generate multiple electron-hole pairs for a single incident photon. Additionally or alternatively, the wavelength-selective light detector 408 may include linear-mode APDs. In some embodiments, the wavelength-selective light detector 408 may be biased above an avalanche breakdown voltage. Such a biasing condition may create a positive feedback loop having a loop gain that is greater than one. In addition, SPADs biased above the threshold avalanche breakdown voltage may be single-photon sensitive. In other examples, the wavelength-selective light detector 408 may include photoresistors, charge-coupled devices (CCDs), photovoltaic cells, and/or any other type of light detector.

As illustrated in FIG. 4B, the lidar device may include multiple wavelength-selective light detectors 408. In some implementations, the array of wavelength-selective light detectors 408 may include more than one type of wavelength-selective light detector across the array. For example, the array of wavelength-selective light detectors 408 can be configured to detect multiple predefined wavelengths of light (e.g., in embodiments where the light emitters 402 emit different wavelengths of light across the array of light emitters 402 illustrated in FIG. 4B). To that end, for example, the array of wavelength-selective light detectors 408 may include some SPADs that are sensitive to one range of wavelengths and other SPADs that are sensitive to a different range of wavelengths. In some embodiments, the wavelength-selective light detectors 408 may be sensitive to wavelengths between 400 nm and 1.6 µm (visible and/or infrared wavelengths), or some subset of those wavelengths.

Further, the wavelength-selective light detectors 408 may have various sizes and shapes. For example, the wavelength-selective light detectors 408 may include SPADs that have package sizes that are 1%, 0.1%, or 0.01% of the total area of the detector substrate 407. Still further, in some embodiments, one or more of the wavelength-selective light detectors 408 may include detector-specific optics. For example, each of the wavelength-selective light detectors 408 may include a micro-lens positioned over the wavelength-selective light detector 408 to enhance the amount of received light that is transmitted to a detection surface of the wavelength-selective light detector 408. Additionally or alternatively, one or more of the wavelength-selective light detectors 408 may include one or more optical filters (e.g., neutral-density filter(s), polarization filter(s), and/or chromatic filter(s)). For example, one or more of the wavelength-selective light detectors 408 may include a chromatic filter to filter out wavelengths outside of a given wavelength range (e.g., outside of a wavelength range corresponding to the wavelengths emitted by the corresponding light emitter 402, as may be determined by a wavelength-locking mechanism).

The wavelength-selective light detectors 408 illustrated in FIG. 4A may be arranged so as to correspond to the endpoints of specific light guides 404. As such, if the substrate 400 is sufficiently transparent or translucent, the wavelength-selective light detectors 408 may detect light signals reflected from the surrounding environment, transmitted through the substrate 400, and then transmitted through the aperture 412 defined in the aperture plate 410. Hence, each of the wavelength-selective light detectors 408 may correspond to one of the light emitters 402 (e.g., and to one of the light guides 404). For example, each of the wavelength-selective light detectors 408 may be positioned above an output end of the light guide 404 that corresponds to one of the light emitters 402.

As described above, each of the wavelength-selective light detectors 408 may correspond to a respective light emitter 402 in the lidar device. However, in other embodiments, multiple wavelength-selective light detectors 408 may correspond to a single light emitter 402 or a single wavelength-selective light detector 408 may correspond to multiple light emitters 402.

As with the light guides 404 and the light emitters 402 illustrated in FIGS. 4A and 4B, the number and position of the wavelength-selective light detectors 408 in FIGS. 4A and 4B is provided solely as an example. If the positions of the light guides 404, the size/shape of the light guides 404, the angles of the angled portions 406, the number of light guides 404, etc. were to change, the number and/or locations of the wavelength-selective light detectors 408 might change correspondingly.

The aperture plate 410 may be fabricated from an opaque material (e.g., a material that reflects and/or absorbs light of wavelengths emitted by the light emitters 402 of the lidar device). Further, the aperture plate 410 may have one or more apertures 412 defined therein, as described above.

The aperture plate 410 may have an array of apertures 412 defined therein such that when the aperture plate 410 is aligned to the substrate 400 and the detector substrate 407, each aperture 412 aligns with a corresponding end of a light guide 404 and/or a corresponding wavelength-selective light detector 408. In this way, a light signal emitted from one of the light guides 404 can be received through a corresponding aperture 412 once reflected from the surrounding environment. As illustrated in FIG. 4A, the aperture plate 410 may be positioned between the substrate 400 and the detector substrate 407.

As illustrated in FIGS. 4A and 4B, each light guide 404 may include a distributed Bragg reflector 422 as a wavelength-locking mechanism. The distributed Bragg reflector 422 may be defined within the light guides 404, as illustrated. As described above, the light guide 404 may have the distributed Bragg reflector imprinted into it or lithography may be used to define a distributed Bragg reflector 422 within the light guide 404. For example, in some embodiments, the distributed Bragg reflector 422 may be fabricated within the light guide 404 by varying the light exposure (e.g., ultraviolet exposure) to different regions of a photoresist (e.g., SU-8 photoresist) that is used when generating the light guide 404. Variable exposure for a photoresist may result in correspondingly varied photonic characteristics (e.g., different refractive indices and/or transmission coefficients). Alternatively, a mask used to fabricate the light guide 404 may include a portion that results in a slot in the middle of the light guide 404 (e.g., between 5 µm and 15 µm in length). Such a slot could be filled with a viscous liquid (e.g., a photosensitive viscous liquid used in holography). Such a viscous liquid could then be exposed to a laser used to write a grating into the viscous liquid and then the liquid may be allowed to cure, thus resulting in the distributed Bragg reflector 422. Further, as illustrated, the distributed Bragg reflector 422 may be positioned near a middle portion of the light guide 404. However, in other embodiments, the distributed Bragg reflector 422 may be positioned near other portions of the light guide (e.g., nearer to the light emitter 402 and/or nearer to an angled portion 406 at an opposite end of the light guide 404 from the light emitter 402). In some embodiments, positioning the distributed Bragg reflector 422 closer to the light emitter 402 may enhance wavelength locking and/or allow for greater control of an emission bandwidth of the light emitter 402 using the distributed Bragg reflector 422.

In some embodiments, multiple distributed Bragg reflectors 422 may be used within a single light guide 404/single transmit channel. This may, for example, enhance the wavelength-locking properties of the lidar device. In embodiments with multiple distributed Bragg reflectors 422 in a single light guide 404, the multiple distributed Bragg reflectors 422 may be adequately spaced so as not to create interference with one another.

Further, the distributed Bragg reflector 422 may select for a specific wavelength range to partially transmit to an environment and partially redirect back toward the light emitter 402 through the light guide 404. This redirected light may provide wavelength locking by inducing the light emitter 402 (e.g., laser diode) to lase at a wavelength within the wavelength range. In other words, the distributed Bragg reflector 422 may allow (e.g., in embodiments where the light emitter 402 comprises a laser diode) the light emitter 402 to be externally locked (as opposed to being internally locked by a device within the light emitter 402). This external locking of the light emitter 402 may lead to temperature independence of the light emitter 402 (e.g., may reduce the amount that the emission wavelength of the light emitter 402 varies with changing ambient temperature). For example, the distributed Bragg reflector 422 and/or other wavelength-locking mechanisms described herein may reduce the temperature-dependence of the center emission wavelength of the light emitter 402 from between 0.1 nm/° C. to 0.5 nm/° C. (e.g., 0.3 nm/° C.) to between 0.0005 nm/° C. and 0.0015 nm/° C. (e.g., 0.001 nm/° C.). Similarly, the distributed Bragg reflector 422 and/or other wavelength-locking mechanisms described herein may narrow the wavelength emission band of the light emitter 402 from 10.0 nm to 1.0 nm. In some lidar devices, maintaining a relatively specific emission wavelength may be beneficial. As such, by reducing the temperature-dependence of the light emitter 402, the use of external mechanisms for maintaining the temperature of the light emitter in order to maintain emission wavelength (e.g., thermo-electric heaters or thermo-electric coolers) may be avoided.

As illustrated in FIG. 4B, each of the adjacent light guides 404 may have a distributed Bragg reflector 422 with the same geometry (e.g., the same period). In some embodiments, the material of the adjacent distributed Bragg reflectors 422 may also be the same. As such, the wavelength range redirected toward the light emitters 402 by each of the distributed Bragg reflectors 422 may be the same. However, in some embodiments (e.g., as shown and described with reference to FIG. 8A), there may be variations among the distributed Bragg reflectors 422, which may allow for wavelength differentiation among channels and, thereby, may provide crosstalk reduction/elimination (i.e., channel isolation). Further, crosstalk reduction/elimination may prevent the occurrence of blooming artifacts. Blooming artifacts sometimes arise in lidar devices where highly reflective surfaces (e.g., retroreflectors) are present in a surrounding environment. Because highly reflective surfaces can lead to high-intensity return signals, highly reflective surfaces can also result in multiple channels being influenced by neighboring channels based on crosstalk. This influence of neighboring channels can result in a "blooming artifact" within the measured data, where more channels measure a high-intensity return than should based on the size of the highly reflective surface in the environment. In cases where crosstalk is mitigated, however, adjacent channels have limited influence on one another, thereby preventing blooming artifacts that might otherwise occur.

Figure 5A:
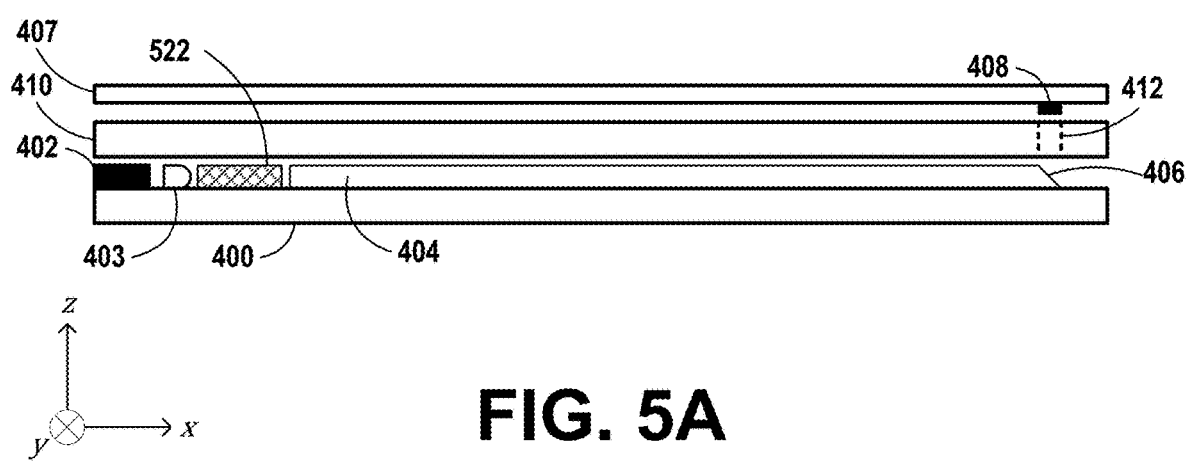
FIG. 5A is a side-view illustration of a lidar device, according to example embodiments.

FIG. 5A is a side-view illustration (e.g., along the y-axis, as illustrated) of a lidar device, according to example embodiments. Similar to the lidar device illustrated in FIGS. 4A and 4B, the lidar device in FIG. 5A may include a substrate 400 (e.g., a transparent substrate), a light emitter 402 (e.g., a laser diode), a fast-axis collimator (FAC) lens 403, a light guide 404 with an angled portion 406 at one end, a wavelength-selective light detector 408 on a detector substrate 407, and an aperture plate 410 with an aperture 412 defined therein (illustrated with a dashed line). Unlike the lidar device in FIGS. 4A and 4B, though, the lidar device in FIG. 5A may not include a distributed Bragg reflector 422. Instead, the lidar device in FIG. 5A may include a volume Bragg grating 522 positioned between the FAC lens 403 and the light guide 404. The volume Bragg grating 522 may serve as the wavelength-locking mechanism in the embodiment of FIG. 5A. Like the distributed Bragg reflector 422 illustrated in FIGS. 4A and 4B, the volume Bragg grating 522 may redirect a portion of the light emitted by the light emitter 402 back toward the light emitter 402 in order to induce the light emitter 402 to emit light at a selected wavelength (e.g., where the light emitter 402 includes a laser, the redirected light may stimulate emission at the redirected wavelength). The selected wavelength may be based on the geometry (e.g., period) and materials of the volume Bragg grating 522.

In some embodiments, the volume Bragg grating 522 may be an active volume Bragg grating. An active volume Bragg grating may allow for enhanced temperature control (e.g., modulation of the period of the volume Bragg grating 522 or other geometry of the volume Bragg grating 522 with changing temperature to counteract thermal expansion and/or to account for changes in the light emitter 402, such as semiconductor changes within a laser diode). In some embodiments, the lidar device may include a controller. The controller may control a firing sequence of one or more light emitters 402, analyze detected signals from one or more wavelength-selective light detectors 408, etc. Such a controller may also modulate the volume Bragg grating 522 in embodiments where the volume Bragg grating 522 is an active grating (e.g., the controller may execute a set of instructions stored on a non-transitory, computer-readable medium to perform functions that cause the volume Bragg grating 522 to be modified). For example, one or more actuators may be incorporated with the active volume Bragg grating 522, and the controller may cause the actuators to adjust the geometry (e.g., period, orientation, etc.) of the volume Bragg grating 522. Even further, the controller may modulate the volume Bragg grating 522 based on information received from one or more auxiliary sensors. For example, the controller may receive a temperature reading from a temperature sensor and, based on the temperature reading, may modulate the volume Bragg grating 522 in order to counteract the change in temperature so as to maintain a selected wavelength of the volume Bragg grating 522 and, thereby, an operating wavelength of the light emitter 402.

Figure 5B:
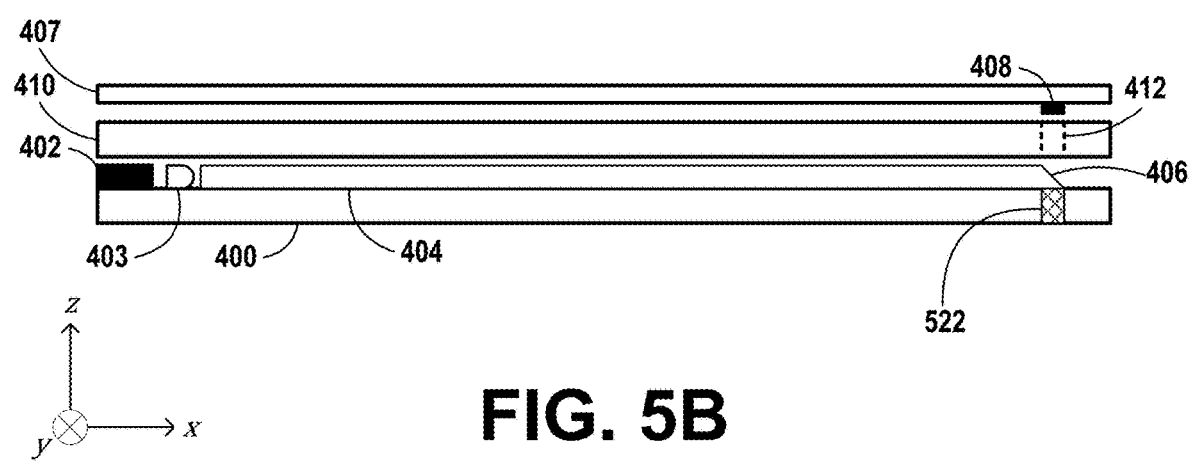
FIG. 5B is a side-view illustration of a lidar device, according to example embodiments.

FIG. 5B is a side-view illustration of a lidar device, according to example embodiments. The lidar device of FIG. 5B may be similar to the lidar device of FIG. 5A (e.g., include a volume Bragg grating 522 as a wavelength-locking mechanism). As with the lidar device of FIG. 5A, the volume Bragg grating 522 may enable a narrower band of wavelengths to be emitted by the light emitter 402 and/or may provide temperature independence of the light emitted by the light emitter 402. However, unlike the lidar device of FIG. 5A, the volume Bragg grating 522 in the lidar device of FIG. 5B may instead be embedded within a portion of the substrate 400, but still along an optical path of a light signal emitted by the light emitter 402 (e.g., as illustrated in FIG. 5B). As such, the volume Bragg grating 522 in FIG. 5B may redirect a portion of the light emitted by the light emitter 402 back toward the light emitter 402 in order to stabilize a wavelength emitted by the light emitter 402. In order to fabricate the lidar device of FIG. 5B, a recess or hole may be defined within the substrate 400 (e.g., after the light emitter 402, FAC lens 403, and/or the light guide 404 are positioned on the substrate 400). Thereafter, the volume Bragg grating 522 may be inserted into the recess or the hole defined within the substrate 400.

Figure 6:
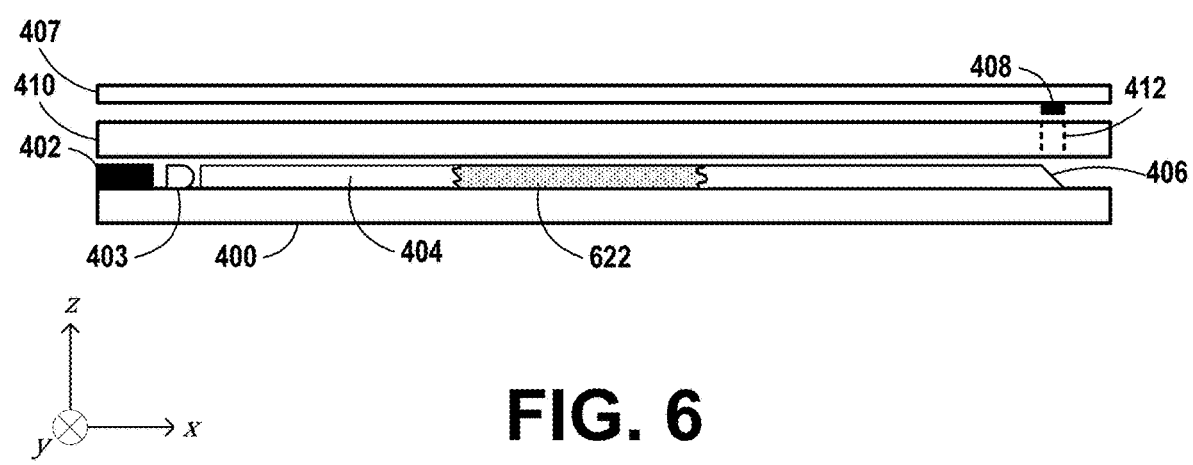
FIG. 6 is a side-view illustration of a lidar device, according to example embodiments.

FIG. 6 is a side-view illustration (e.g., along the y-axis, as illustrated) of a lidar device, according to example embodiments. Similar to the lidar devices illustrated in FIGS. 4A-5B, the lidar device in FIG. 6 may include a substrate 400 (e.g., a transparent substrate), a light emitter 402 (e.g., a laser diode), a fast-axis collimator (FAC) lens 403, a light guide 404 with an angled portion 406 at one end, a wavelength-selective light detector 408 on a detector substrate 407, and an aperture plate 410 with an aperture 412 defined therein (illustrated with a dashed line). Unlike the lidar devices in FIG. 4A-5B, though, the lidar device in FIG. 6 may include a dye 622. As illustrated, the dye 622 may be located within the light guide 404. In alternate embodiments, though, the dye 622 may be contained by a transparent structure or may be a colloidal structure (e.g., a gel). The transparent structure or the colloidal structure may be positioned between the light emitter 402 and the FAC lens 403, between the FAC lens 403 and the light guide 404, or between separated portions of the light guide 404 (e.g., if the light guide 404 were cleaved into two separate portions).

The dye 622 may be used as a wavelength-locking mechanism within the lidar device of FIG. 6. For example, the dye 622 may absorb wavelengths outside of a select wavelength range. Further, as described above, the dye 622 may redirect a portion of the light emitted by the light emitter 402 back toward the light emitter 402 (e.g., within a select wavelength range) so as to provide wavelength locking of the light emitter 402. Additionally or alternatively, in some embodiments, there may be a quantum-dot material within the light guide 404. The quantum-dot material may also redirect a portion of the light emitted by the light emitter 402 back toward the light emitter 402 so as to provide wavelength locking of the light emitter 402 and/or absorb light outside of a narrow wavelength band.

In some embodiments, the dye 622 may include a coumarin (e.g., $C_9H_6O_2$) and/or a rhodamine (e.g., $C_{28}H_{31}ClN_2O_3$). Further, in various embodiments, the dye 622 may be doped into a polymer material, functionalized onto one or more polymers, and/or may be incorporated into a sol-gel glass. In order to determine the wavelength range that will be selected for by the dye 622, one or more functional groups attached to the dye compound may be chosen (i.e., one or more portions of the chemical composition may correspond to the selected wavelength). Additionally or alternatively, the wavelength selected for by the dye 622 may be selected by setting one or more chemical environmental conditions (e.g., by setting the pH of the medium surrounding the dye).

In embodiments that include a quantum-dot material, the quantum-dot material may be a dispersion of quantum dots within a host (e.g., a glass host or a polymer host). Further, the quantum dots may be made of materials that have a band gap that corresponds to a lower photon energy than the photon energy corresponding to the wavelength for which the quantum-dot material is selecting (e.g., the center wavelength output by the light emitter 402). For example, a peak in the absorption spectrum of the quantum dots may correspond to the selected wavelength (e.g., 905 nm). In the example of a 905 nm wavelength selection, InGaAs may be used. Other wavelengths and other compounds are also possible and contemplated here. The selected-for wavelength may be determined based on a band gap of and/or a size of (e.g., a radius of) the quantum dots within the quantum-dot material.

As mentioned above, the dye 622 and/or the quantum-dot material may redirect a portion of the emitted light back toward the light emitter 402. In addition to wavelength-locking an output of the light emitter 402 (e.g., making an output signal of the light emitter 402 less susceptible to changes in temperature), absorbing wavelengths outside of a given wavelength range may narrow an emission spectrum of the light emitter 402, as mentioned above. Reducing the emission spectrum of the light emitter 402 may improve signal-to-noise ratio, as well. For example, if an emission spectrum of the light emitter 402 is narrowed, then an optical filter with a narrower passband (e.g., positioned over a corresponding wavelength-selective light detector 408) can be used to eliminate noise without reducing the amount of signal that is detected by the wavelength-selective light detector. Hence, if a narrower passband optical filter is used, the resulting signal detected may remain the same while the amount of noise detected decreases (i.e., the signal-to-noise ratio may be improved). While the dye 622 and/or the quantum-dot material have been described above as having the potential to narrow emission spectra of lidar devices, it is understood that each of the other wavelength-locking mechanisms described and contemplated herein (e.g., distributed Bragg reflectors, volume Bragg gratings, optical filters, etc.) may equally be capable of narrowing emission spectra of corresponding light emitters (e.g., in addition to or instead of performing wavelength locking).

Figure 7:
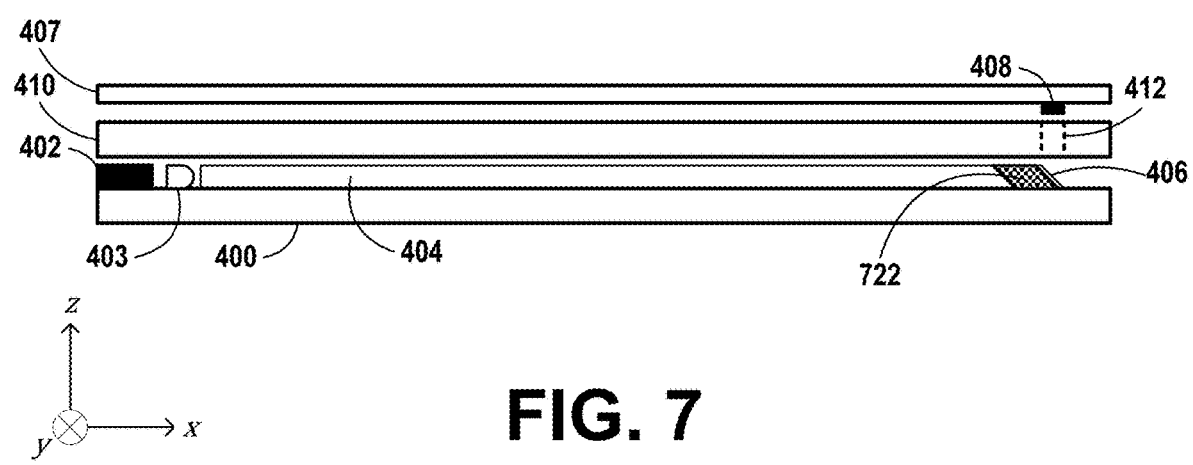
FIG. 7 is a side-view illustration of a lidar device, according to example embodiments.

FIG. 7 is a side-view illustration (e.g., along they-axis, as illustrated) of a lidar device, according to example embodiments. Similar to the lidar devices illustrated in FIGS. 4A-6, the lidar device in FIG. 7 may include a substrate 400 (e.g., a transparent substrate), a light emitter 402 (e.g., a laser diode), a fast-axis collimator (FAC) lens 403, a light guide 404 with an angled portion 406 at one end, a wavelength-selective light detector 408 on a detector substrate 407, and an aperture plate 410 with an aperture 412 defined therein (illustrated with a dashed line). Unlike the lidar devices in FIG. 4A-6, though, the lidar device in FIG. 7 may include an optical filter 722. The optical filter 722 may be positioned at an end of the light guide 404 opposite an end at which the light emitter 402 is positioned (e.g., as illustrated). In alternate embodiments, the optical filter 722 may instead be positioned between the FAC lens 403 and the light guide 404 or between the light emitter 402 and the FAC lens 403. Other positions of the optical filter 722 are also possible. In some embodiments, for example, the optical filter 722 may be a planar filter that coats the surface of the substrate 400 (e.g., the optical filter 722 may be a planar filter oriented with a normal direction along the z-axis and positioned between the substrate 400 and the light emitter 402, FAC lens 403, and light guide 404). In some embodiments, the optical filter 722 may be positioned such that it interacts with a light signal emitted by the light emitter 402 on both a transmit path (e.g., before the light signal is emitted into a surrounding environment) and a receive path (e.g., after a light signal is received from a surrounding environment once being reflected from an object in the surrounding environment). For example, in the lidar device of FIG. 7, the optical filter 722 may interact with a light signal upon the light signal reaching the angled portion 406 of the light guide prior to the light signal being transmitted to a surrounding environment. Additionally, in the lidar device of FIG. 7, the optical filter 722 may interact with the light signal upon the light signal returning from the surrounding environment prior to the light signal being transmitted through the aperture 412 in the aperture plate 410 to the wavelength-selective light detector 408.

In some embodiments, the optical filter 722 may absorb (or partially absorb) one or more ranges of wavelengths, may transmit (or partially transmit) one or more other ranges of wavelengths, and/or may reflect (or partially reflect) yet other ranges of wavelengths. As such, the optical filter 722 may redirect light of a specific wavelength range back toward the light emitter 402 (e.g., while absorbing other ranges of wavelengths) so as to provide wavelength locking and/or narrowing of emission spectrum.

An example non-absorbing optical filter 722 may include a plurality of thin-film metal-oxide layers positioned on a transparent substrate (e.g., a silica substrate). An example of an absorbing optical filter 722 may include a plurality of thin-film metal layers (e.g., aluminum and/or gold layers) interspersed with transparent layers (e.g., silica layers) in a stack. In various embodiments, the reflection spectrum, absorption spectrum, and/or transmission spectrum of the optical filter 722 may be tailored to a specific shape (e.g., to obtain a correspondingly tailored shape in the emission spectrum of the light emitter 402). In some embodiments, for example, the reflectivity of the optical filter 722 may be between 5% and 25% (e.g., 15%) for a chosen center wavelength or range of center wavelengths (e.g., a range of 900 nm to 910 nm, 1040 nm to 1060 nm, 1.54 μm to 1.56 μm, etc.). In addition, the reflectivity of the optical filter 722 may fall off the farther a specific light signal is from the chosen center wavelength or range of center wavelengths. For example, the reflectivity of the optical filter 722 may be less than 5%, less than 4%, less than 3%, less than 2%, less than 1%, less than 0.1%, or less than 0.01% once the wavelength of a light signal is more than 5 nm, more than 10 nm, more than 15 nm, more than 20 nm, more than 25 nm, more than 30 nm, more than 35 nm, more than 40 nm, more than 45 nm, more than 50 nm, etc. away from the center wavelength/range of center wavelengths. The fall off of the reflectivity from the center wavelength/range of center wavelengths may be linear, exponential, or gaussian, in various embodiments. Further, in some embodiments, the fall off may be quite steep (e.g., exhibiting a large negative exponential with respect to wavelength the further the wavelength is from the center wavelength). To achieve this, some embodiments may include a plurality of alternating layers, where the alternating layers have similar refractive indices and are large, odd multiples of quarter wavelengths of the light emitted by the light emitter 402 (e.g., 7/4λ, 9/4λ, 11/4λ, 13/4λ, 15/4λ, 17/4λ, 19/4λ, 21/4λ, 23/4λ, 25/4λ, 27/4λ, 29/4λ, 31/4λ, 33/4λ, 35/4λ, etc.).

Figure 8A:
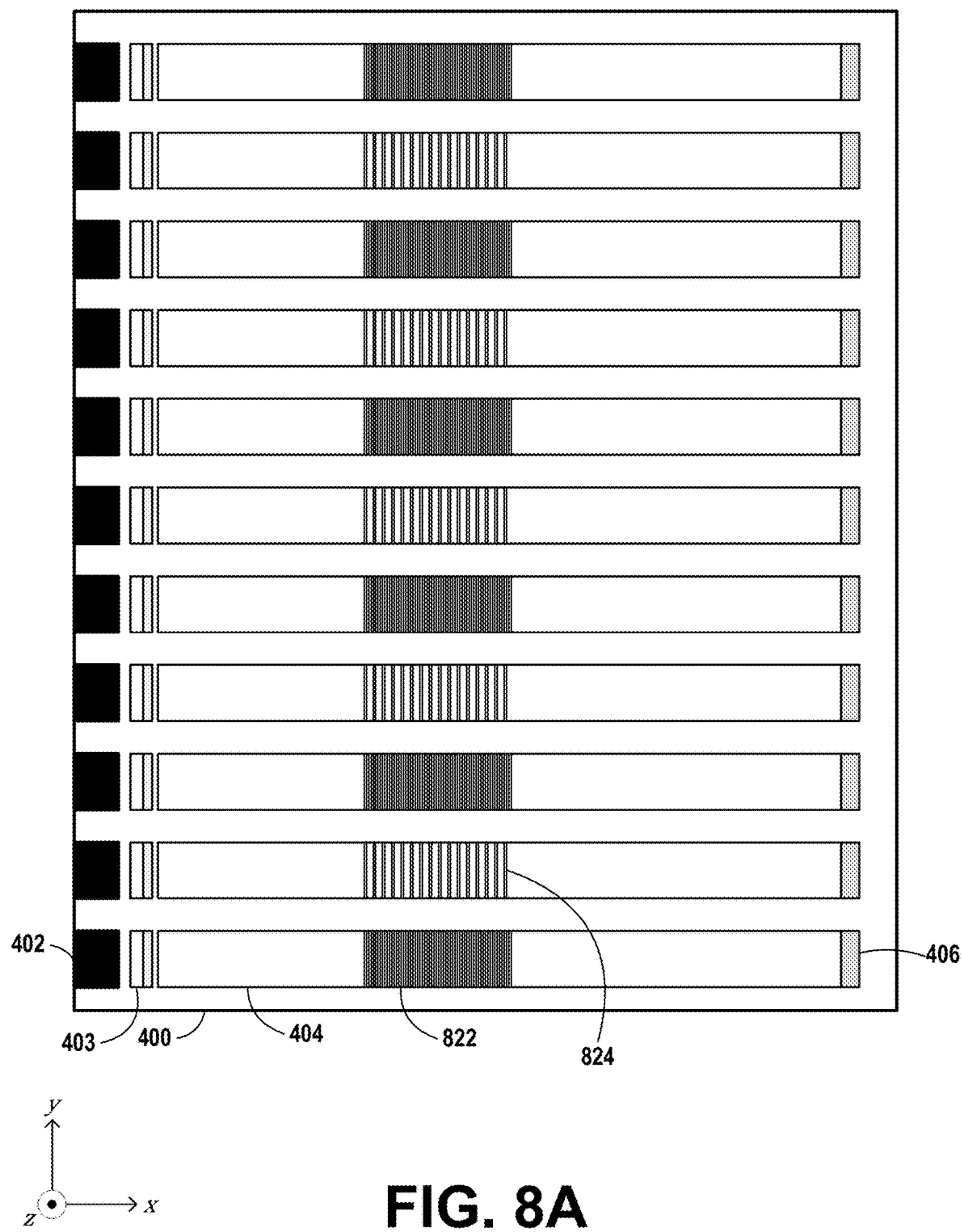
FIG. 8A is a top-view illustration of a lidar device, according to example embodiments.

FIG. 8A is a top-view illustration (e.g., along the z-axis, as illustrated) of a lidar device, according to example embodiments. As in FIG. 4B, the aperture plate 410 and the wavelength-selective light detector 408/detector substrate 407 have been removed for the purposes of illustration (e.g., so they do not occlude the substrate 400 and other components in the drawing). Further, similar to the lidar device illustrated in FIG. 4B, the lidar device illustrated in FIG. 8A may include a substrate 400, multiple light emitters 402, multiple FAC lenses 403, and multiple light guides 404 having angled portions 406 at one end. Further, similar to the lidar device illustrated in FIG. 4B, the lidar device illustrated in FIG. 8A includes distributed Bragg reflectors. However, unlike the distributed Bragg reflectors 422 illustrated in FIG. 4B, there are two different types of distributed Bragg reflectors illustrated in FIG. 8A (first distributed Bragg reflectors 822 and second distributed Bragg reflectors 824). As illustrated, the first distributed Bragg reflectors 822 may be positioned within light guides 404 of first transmit channels and the second distributed Bragg reflectors 824 may be positioned within light guides of second transmit channels. The first distributed Bragg reflectors 822 and/or the second distributed Bragg reflectors 824 may be fabricated using similar methods to the distributed Bragg reflectors 422 described above. Further, as illustrated, the first transmit channels may be adjacent to the second transmit channels.

The first distributed Bragg reflectors 822 and the second distributed Bragg reflectors 824 may have different periods, different refractive-index variations, or different geometries from one another so as to select for different wavelength ranges (e.g., the first distributed Bragg reflectors 822 may select for wavelengths between 904 nm and 906 nm and the second distributed Bragg reflectors 824 may select for wavelengths between 909 nm and 911 nm). Selecting for different wavelength ranges in adjacent channels may provide crosstalk reduction/elimination (i.e., channel isolation).

For example, an optical filter positioned within a wavelength-selective light detector corresponding to the first transmit channel may pass a narrow band of wavelengths that includes the wavelength selected for by the first distributed Bragg reflector 822 but excludes the wavelength selected for by the second distributed Bragg reflector 824. Similarly, an optical filter positioned within a wavelength-selective light detector corresponding to the second transmit channel may pass a narrow band of wavelengths that includes the wavelength selected for by the second distributed Bragg reflector 824 but excludes the wavelength selected for by the first distributed Bragg reflector 822. In this way, light from the light emitter 402 of the first transmit channel may not be detected by the wavelength-selective light detector corresponding to the second transmit channel and vice versa, thereby providing channel isolation. For example, even if light from the first transmit channel reaches the optical filter corresponding to the second transmit channel, the optical filter can filter out such light to prevent crosstalk.

As illustrated in FIG. 8A, transmit channels may alternate with one transmit channel including a first distributed Bragg reflector 822 being adjacent to another transmit channel including a second distributed Bragg reflector 824, which itself is adjacent to a transmit channel that includes a first distributed Bragg reflector 822. In this way, no transmit channel may include a wavelength-locking mechanism that selects for the same wavelength as a wavelength-locking mechanism in a neighboring transmit channel. It is understood, however, that other arrangements are also possible. For example, some embodiments may include three different types of distributed Bragg reflectors that select for three separate wavelengths. Those three different distributed Bragg reflectors may be used as wavelength-locking mechanisms in different transmit channels within the lidar device. For instance, transmit channels may be staggered in a 1-2-3-1-2-3-1-2-3 . . . arrangement (where the numeral "1" corresponds to a transmit channel that includes the first type of distributed Bragg reflector, the numeral "2" corresponds to a transmit channel that includes the second type of distributed Bragg reflector, and the numeral "3" corresponds to a transmit channel that includes the third type of distributed Bragg reflector). Alternatively, transmit channels may be staggered in a 1-2-3-2-1-2-3-2-1-2-3-2-1 . . . arrangement (where the numeral "1" corresponds to a transmit channel that includes the first type of distributed Bragg reflector, the numeral "2" corresponds to a transmit channel that includes the second type of distributed Bragg reflector, and the numeral "3" corresponds to a transmit channel that includes the third type of distributed Bragg reflector). Such an arrangement may be used, for example, when the wavelength selected for by the first distributed Bragg reflector is close to the wavelength selected for by the third distributed Bragg reflector, but is further away from the wavelength selected for by the second distributed Bragg reflector. In this way, those transmit channels that would otherwise be most susceptible to crosstalk are positioned at least two channels away from one another. Other arrangements are also possible and contemplated herein. For example, in still other embodiments (e.g., embodiments with hundreds of different types of distributed Bragg reflectors that select for hundreds of different wavelengths), the selection of which distributed Bragg reflector goes within which transmit channel may be determined randomly or pseudo-randomly (e.g., prior to fabrication).

Figure 8B:
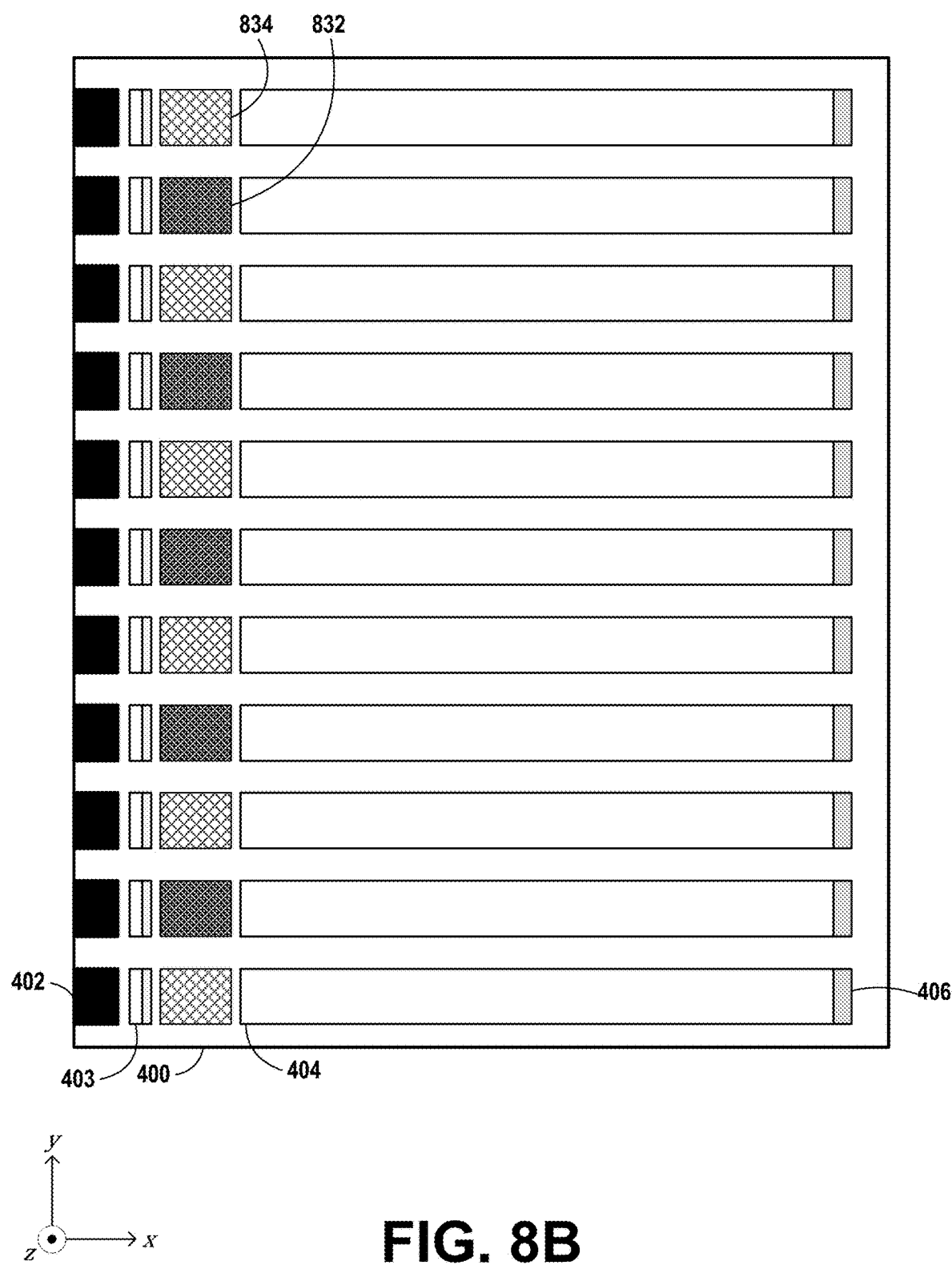
FIG. 8B is a top-view illustration of a lidar device, according to example embodiments.

FIG. 8B is a top-view illustration (e.g., along the z-axis, as illustrated) of a lidar device, according to example embodiments. As in FIG. 4B, the aperture plate 410 and the wavelength-selective light detector 408/detector substrate 407 have been removed for the purposes of illustration (e.g., so they do not occlude the substrate 400 and other components in the drawing). Further, similar to the lidar device illustrated in FIG. 8A, the lidar device illustrated in FIG. 8B may include a substrate 400, multiple light emitters 402, multiple FAC lenses 403, and multiple light guides 404 having angled portions 406 at one end. Further, similar to the lidar device illustrated in FIG. 8A, the lidar device illustrated in FIG. 8B may include multiple wavelength-locking mechanisms. However, instead of the distributed Bragg reflectors 822, 824, the lidar device of FIG. 8B includes volume Bragg gratings. As illustrated in FIG. 8B, the lidar device includes two different types of volume Bragg gratings: first volume Bragg gratings 832 and second volume Bragg gratings 834. The first volume Bragg gratings 832 may be positioned between the FAC lenses 403 and the light guides 404 in a first set of transmit channels (e.g., to lock the light emitters 402 within the first set of transmit channels to a first wavelength). Similarly, the second volume Bragg gratings 834 may be positioned between the FAC lenses 403 and the light guides 404 in a second set of transmit channels (e.g., to lock the light emitters 402 within the second set of transmit channels to a second wavelength). As illustrated in FIG. 8B, the arrangement of transmit channels may alternate between a first transmit channel with a first wavelength and a second transmit channel with a second wavelength. Further, the first wavelength may be different than the second wavelength.

In order to select for different wavelengths, the first volume Bragg gratings 832 may have different geometries, periods, and/or orientations and/or be fabricated from different materials than the second volume Bragg gratings 834. Alternatively, similar to the volume Bragg gratings 522 shown and described with reference to FIGS. 5A and 5B, in some embodiments, the first volume Bragg gratings 832 and the second volume Bragg gratings 834 may be active gratings. For example, the first volume Bragg gratings 832 and the second volume Bragg gratings 834 may be adjustable by a controller. As such, in some embodiments, the first volume Bragg gratings 832 and the second volume Bragg gratings 834 may be the same type of grating but may simply be tuned to different wavelengths (e.g., by tuning a period of the respective volume Bragg gratings 832, 834).

As illustrated in FIG. 8B and described above, the first volume Bragg gratings 832 and the second volume Bragg gratings 834 may be optically positioned between the FAC lenses 403 and the light guides 404 in their respective channels. However, in alternate embodiments, the first volume Bragg gratings 832 and the second volume Bragg gratings 834 may be optically positioned in different regions of the lidar device. For example, the first volume Bragg gratings 832 and the second volume Bragg gratings 834 may instead be optically positioned between the light emitters 402 and the FAC lenses 403 of their respective transmit channels, at output ends of the light guides 404 of their respective transmit channels, and/or embedded within the substrate 400 (e.g., similar to the volume Bragg grating 522 shown and described with reference to FIG. 5B). Further, the first volume Bragg gratings 832 and the second volume Bragg gratings 834 illustrated in FIG. 8B are all optically positioned in the same place within their respective transmit channels. This is only provided by way of example. It is understood that the volume Bragg gratings 832, 834 could instead be optically positioned in different locations in different transmit channels within a single lidar device. For example, in some embodiments, the first volume Bragg gratings 832 may be optically positioned between the light emitters 402 and the FAC lenses 403 of their respective transmit channels and the second volume Bragg gratings 834 may be optically positioned between the FAC lenses 403 and the light guides 404 of their respective channels. Further, it is understood that other numbers and arrangements of volume Bragg gratings are possible and contemplated herein. For example, in some embodiments there may be three, four, five, six, etc. different types of volume Bragg gratings that each select for different wavelength ranges.

Figure 8C:
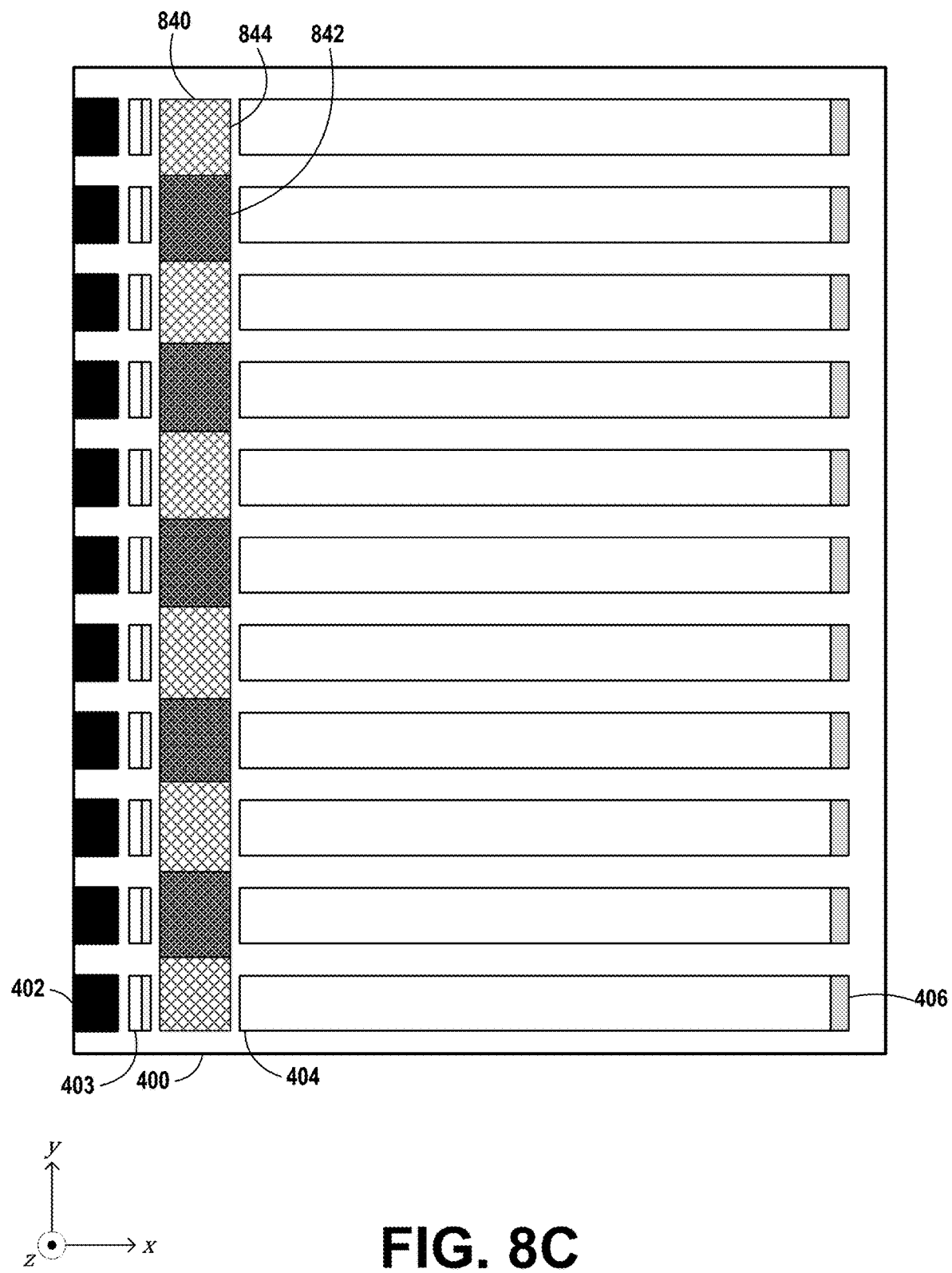
FIG. 8C is a top-view illustration of a lidar device, according to example embodiments.

FIG. 8C is a top-view illustration (e.g., along the z-axis, as illustrated) of a lidar device, according to example embodiments. As in FIG. 4B, the aperture plate 410 and the wavelength-selective light detector 408/detector substrate 407 have been removed for the purposes of illustration (e.g., so they do not occlude the substrate 400 and other components in the drawing). Further, similar to the lidar devices illustrated in FIGS. 8A and 8B, the lidar device illustrated in FIG. 8C may include a substrate 400, multiple light emitters 402, multiple FAC lenses 403, and multiple light guides 404 having angled portions 406 at one end. Further, similar to the lidar devices illustrated in FIGS. 8A and 8B, the lidar device illustrated in FIG. 8C may include multiple wavelength-locking mechanisms. However, instead of distributed Bragg reflectors 822/824 or multiple volume Bragg gratings 832, 834, the lidar device includes a single chirped volume Bragg grating 840. As illustrated, the chirped volume Bragg grating 840 may be positioned between all of the FAC lenses 403 and all of the light guides 404. In other embodiments, the chirped volume Bragg grating 840 may be located in different positions (e.g., between all of the light emitters 402 and all of the FAC lenses 403 or along the ends of all of the light guides 404). While a chirped volume Bragg grating 840 is illustrated in FIG. 8C, it is understood that a chirped distributed Bragg reflector could equally be used for a similar purpose (e.g., to lock the light emitters 402 of adjacent transmit channels to different wavelengths).

Also as illustrated, the chirped volume Bragg grating 840 may include first volume Bragg grating portions 842 and second volume Bragg grating portions 844. The first volume Bragg grating portions 842 may be positioned between the FAC lenses 403 and the light guides 404 of a first set of transmit channels (e.g., to lock the light emitters 402 within the first set of transmit channels to a first wavelength). Similarly, the second volume Bragg grating portions 844 may be positioned between the FAC lenses 403 and the light guides 404 in a second set of transmit channels (e.g., to lock the light emitters 402 within the second set of transmit channels to a second wavelength). As illustrated in FIG. 8C, the arrangement of transmit channels may alternate between a transmit channel of the first set with a first wavelength and a transmit channel of the second set with a second wavelength. Further, the first wavelength may be different than the second wavelength.

The chirped volume Bragg grating 840 may be a single, contiguous grating used to modify multiple transmit channels. However, in order to modify various transmit channels (e.g., adjacent transmit channels) in disparate ways, the first volume Bragg grating portions 842 and the second volume Bragg grating portions 844 may have different geometries. For example, the period of modulation of refractive index for the first volume Bragg grating portions 842 may be different than the period of modulation of refractive index for the second volume Bragg grating portions 844. In this way, different portions of the chirped volume Bragg grating 840 may select for different wavelengths. Hence, the first volume Bragg grating portions 842 and the second volume Bragg grating portions 844 may lock their corresponding light emitters 402 to different wavelengths (e.g., which may allow channel isolation between adjacent transmit channels). In addition to or instead of varying the period of refractive index modulation, other techniques may be used to vary the selected wavelengths of the respective portions 842, 844 of the chirped volume Bragg grating 840 and are contemplated herein (e.g., selecting materials of different refractive indices for different portions of the chirped volume Bragg grating 840). Further, it is understood that other numbers and arrangements of volume Bragg grating portions are possible and contemplated herein. For example, in some embodiments there may be three, four, five, six, etc. different types of volume Bragg grating portions within the chirped volume Bragg grating that each select for different wavelength ranges.

The chirped volume Bragg grating 840 may be fabricated in a multitude of ways. For example, a lithographic light source (e.g., an ultraviolet lamp or a highly collimated ultraviolet laser) and a mask may be used to expose photoresist according to a pattern in the mask so as to generate the various portions (e.g., the first volume Bragg grating portions 842 and the second volume Bragg grating portions 844) of the chirped volume Bragg grating 840. Multiple exposure and/or other lithography steps may be incorporated to generate the chirped volume Bragg grating 840.

In addition, similar to the first volume Bragg gratings 832 and the second volume Bragg gratings 834 shown and described with reference to FIG. 8B, in some embodiments, the chirped volume Bragg grating 840 may be an active grating. For example, the first volume Bragg grating portions 842 and the second volume Bragg grating portions 844 may be adjustable by a controller. As such, in some embodiments, the first volume Bragg grating portions 842 and the second volume Bragg grating portions 844 may be tuned to different wavelengths (e.g., by tuning a period of the respective volume Bragg grating portions 832, 834 using a controller).

Figure 8D:
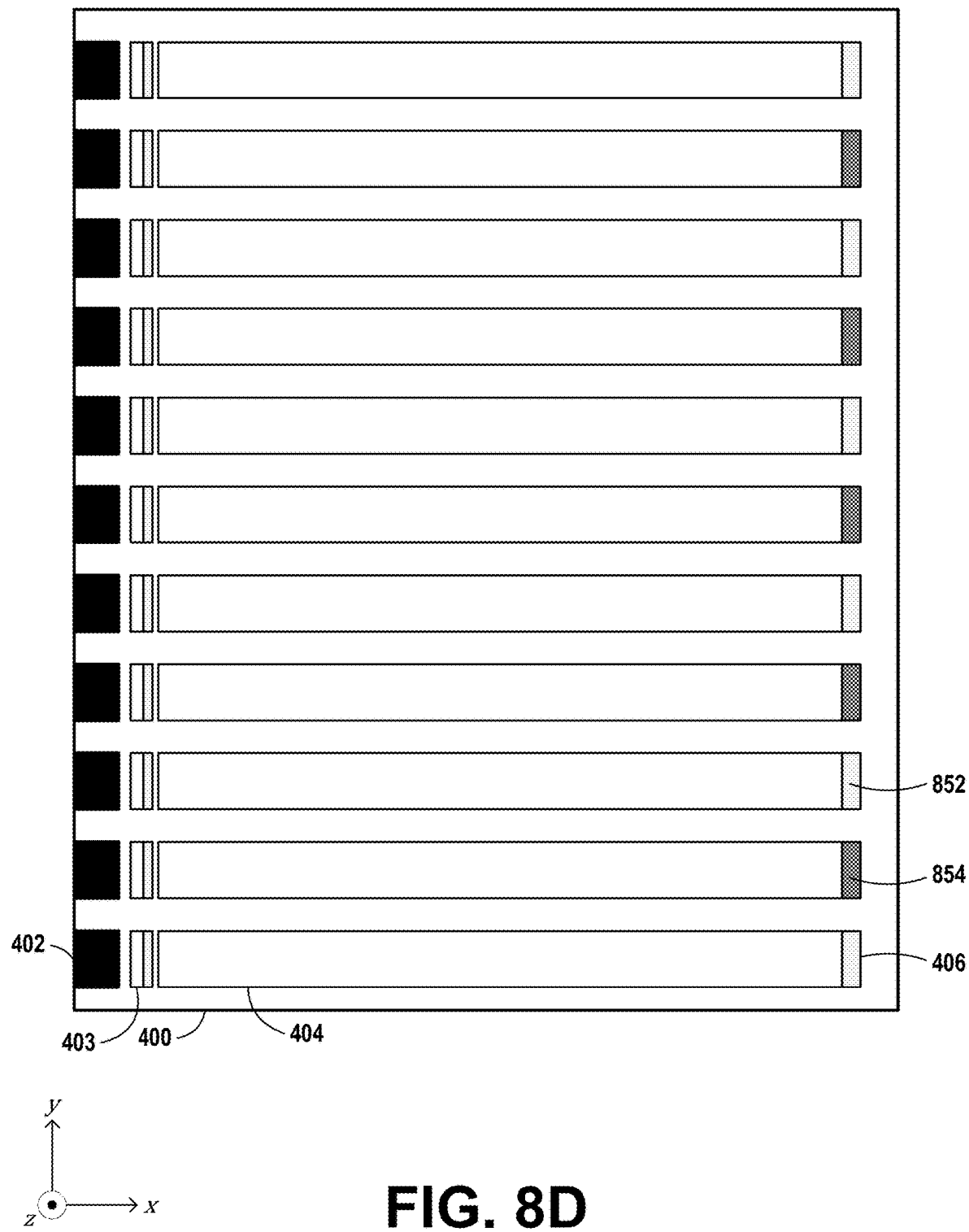
FIG. 8D is a top-view illustration of a lidar device, according to example embodiments.

FIG. 8D is a top-view illustration (e.g., along the z-axis, as illustrated) of a lidar device, according to example embodiments. As in FIG. 4B, the aperture plate 410 and the wavelength-selective light detector 408/detector substrate 407 have been removed for the purposes of illustration (e.g., so they do not occlude the substrate 400 and other components in the drawing). Further, similar to the lidar devices illustrated in FIGS. 8A-8C, the lidar device illustrated in FIG. 8D may include a substrate 400, multiple light emitters 402, multiple FAC lenses 403, and multiple light guides 404 having angled portions 406 at one end. Further, similar to the lidar devices illustrated in FIGS. 8A-8C, the lidar device illustrated in FIG. 8D may include multiple wavelength-locking mechanisms. However, instead of distributed Bragg reflectors 822, 824, multiple volume Bragg gratings 832, 834, or a chirped volume Bragg grating 840, the lidar of FIG. 8D may include multiple optical filters (e.g., first optical filters 852 and second optical filters 854). As illustrated, the first optical filters 852 may be positioned along output facets (e.g., angled portions 406) at ends of light guides 404 in a first set of transmit channels opposite ends at which the light emitters 402 in those transmit channels are positioned. Similarly, the second optical filters 854 may be positioned along output facets (e.g., angled portions 406) at ends of light guides 404 in a second set of transmit channels opposite ends at which the light emitters 402 in those transmit channels are positioned. In other embodiments, the first optical filters 852 and second optical filters 854 may be located in different positions (e.g., between the light emitters 402 and the FAC lenses 403 or between the FAC lenses 403 and the light guides 404).

The first optical filters 852 and the second optical filters 854 may select for different wavelengths. Selecting for different wavelengths may lock the light emitters 402 in the respective transmit channels to different emission wavelengths (e.g., which may provide channel isolation). In some embodiments, for example, the first optical filters 852 may absorb (or partially absorb) a first range of wavelengths, while transmitting and reflecting (or partially transmitting and reflecting) a second range of wavelengths. Additionally, the second optical filters 854 may absorb (or partially absorb) a third range of wavelengths, while transmitting and reflecting (or partially transmitting and reflecting) a fourth range of wavelengths. As such, light emitters 402 in transmit channels corresponding to the first optical filters 852 may be locked to the second range of wavelengths, while light emitters 402 in transmit channels corresponding to the second optical filters 854 may be locked to the fourth range of wavelengths (e.g., thereby providing channel isolation). It is understood that other numbers and arrangements of optical filters are also possible and contemplated herein. For example, in some embodiments there may be three, four, five, six, etc. different types of optical filters that each select for different wavelength ranges.

Figure 8E:
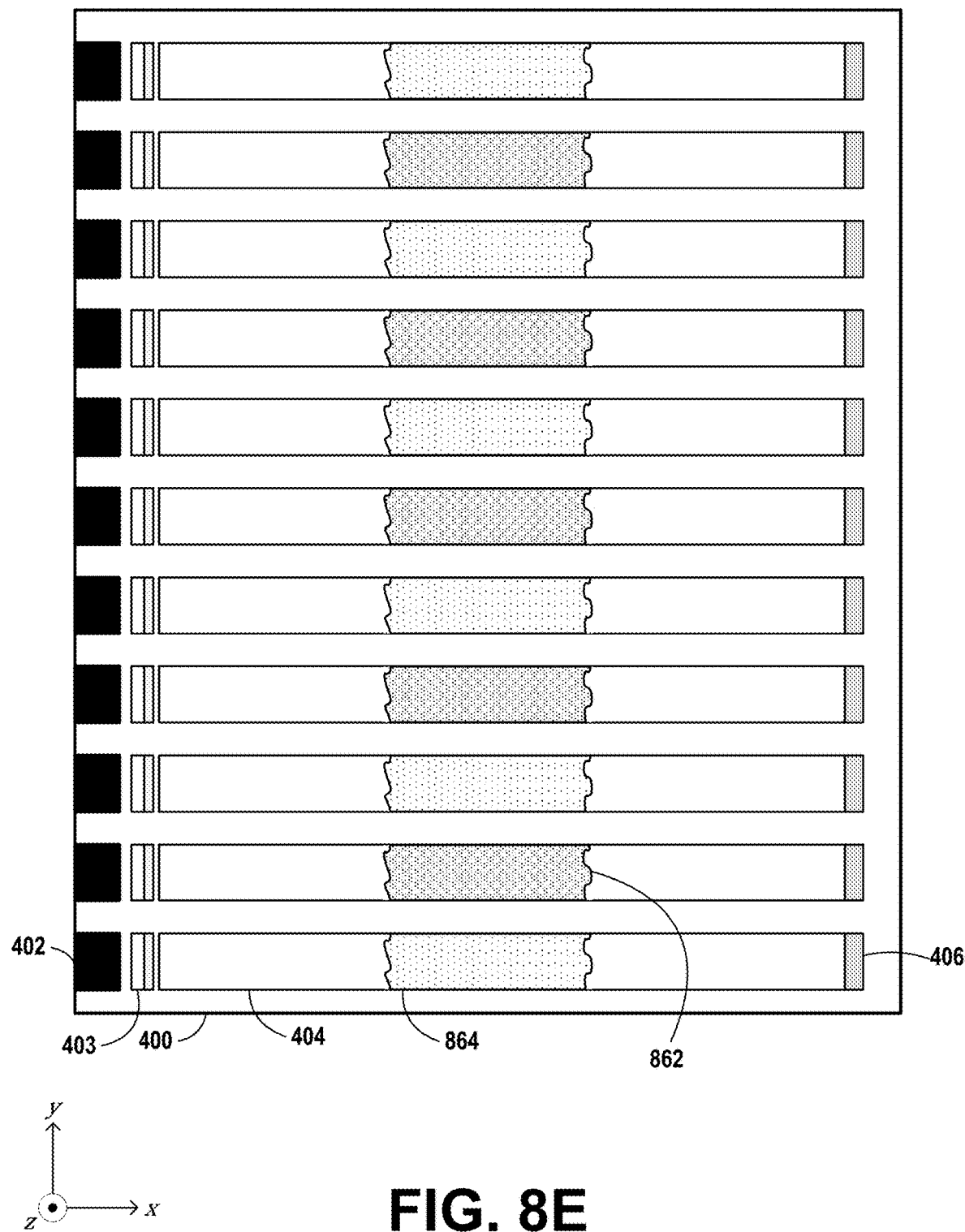
FIG. 8E is a top-view illustration of a lidar device, according to example embodiments.

FIG. 8E is a top-view illustration (e.g., along the z-axis, as illustrated) of a lidar device, according to example embodiments. As in FIG. 4B, the aperture plate 410 and the wavelength-selective light detector 408/detector substrate 407 have been removed for the purposes of illustration (e.g., so they do not occlude the substrate 400 and other components in the drawing). Further, similar to the lidar devices illustrated in FIGS. 8A-8D, the lidar device illustrated in FIG. 8E may include a substrate 400, multiple light emitters 402, multiple FAC lenses 403, and multiple light guides 404 having angled portions 406 at one end. Further, similar to the lidar devices illustrated in FIGS. 8A-8D, the lidar device illustrated in FIG. 8E may include multiple wavelength-locking mechanisms. However, instead of distributed Bragg reflectors 822, 824, multiple volume Bragg gratings 832, 834, a chirped volume Bragg grating 840, or multiple optical filters 852, 854, the lidar device of FIG. 8E may include different dyes and/or quantum-dot materials (e.g., first dyes 862 and second dyes 864). As illustrated, the first dyes 862 may be positioned within light guides 404 (e.g., dye particles may be embedded within the light guides 404) of a first set of transmit channels. Similarly, the second dyes 864 may be positioned within light guides 404 (e.g., dye particles may be embedded within the light guides 404) of a second set of transmit channels. In some embodiments, the first dyes 862 may be supplemented or replaced by first quantum-dot materials and/or the second dyes 864 may be supplemented or replaced by second quantum-dot materials. Additionally or alternatively, in some embodiments the first dyes 862 and/or the second dyes 864 may be positioned in different locations within the light guides 404 (e.g., nearer to the end corresponding to the FAC lens 403 and the light emitter 402 than illustrated or nearer to the end corresponding to the angled portion 406 than illustrated) or dispersed throughout the entirety of the light guides 404. Further, in some embodiments, one or more of the first dyes 862 and/or second dyes 864 may be positioned at different x-locations along the light guides 404 than one another.

As illustrated in FIG. 8E, the first dyes 862 and the second dyes 864 may be located inside the light guides 404. In alternate embodiments, though, the first dyes 862 and/or the second dyes 864 may be located in other structures (e.g., transparent capsules) positioned in one or more of the transmit channels. For example, the first dyes 862 and the second dyes 864 may be disposed within containers that are positioned between the FAC lenses 403 and the light guides 404 of their respective transmit channels in order to provide wavelength locking for the respective light emitters 402. Alternatively, in some embodiments, the light guides 404 may be spliced into multiple sections, and containers filled with the first dyes 862 or second dyes 864 may be positioned between adjacent portions of the light guides 404.

As illustrated and described above with reference to FIGS. 8A-8E, adjacent transmit channels within a lidar device may perform wavelength locking using similar structures tuned to different wavelength ranges. For example, one transmit channel may include a distributed Bragg reflector tuned to one wavelength range while an adjacent transmit channel may include a distributed Bragg reflector tuned to a different wavelength range in order to lock adjacent light emitters to different emission wavelengths. However, it is understood that this is provided solely as an example and that other combinations are possible and contemplated herein. In some embodiments, for instance, different transmit channels within a single lidar device may utilize different wavelength-locking mechanisms. For example, one transmit channel may include a distributed Bragg reflector tuned to a first wavelength range while an adjacent transmit channel may include a volume Bragg grating tuned to a second wavelength range. Further, in some embodiments, different transmit channels may use different numbers of wavelength-locking mechanisms. For example, one embodiment may include a first transmit channel that has one wavelength-locking mechanism tuned to a first wavelength and a second transmit channel that has two wavelength-locking mechanisms tuned to a second wavelength. Other combinations of numbers and types of wavelength-locking mechanisms are also possible.

III. EXAMPLE PROCESSES

Figure 9:
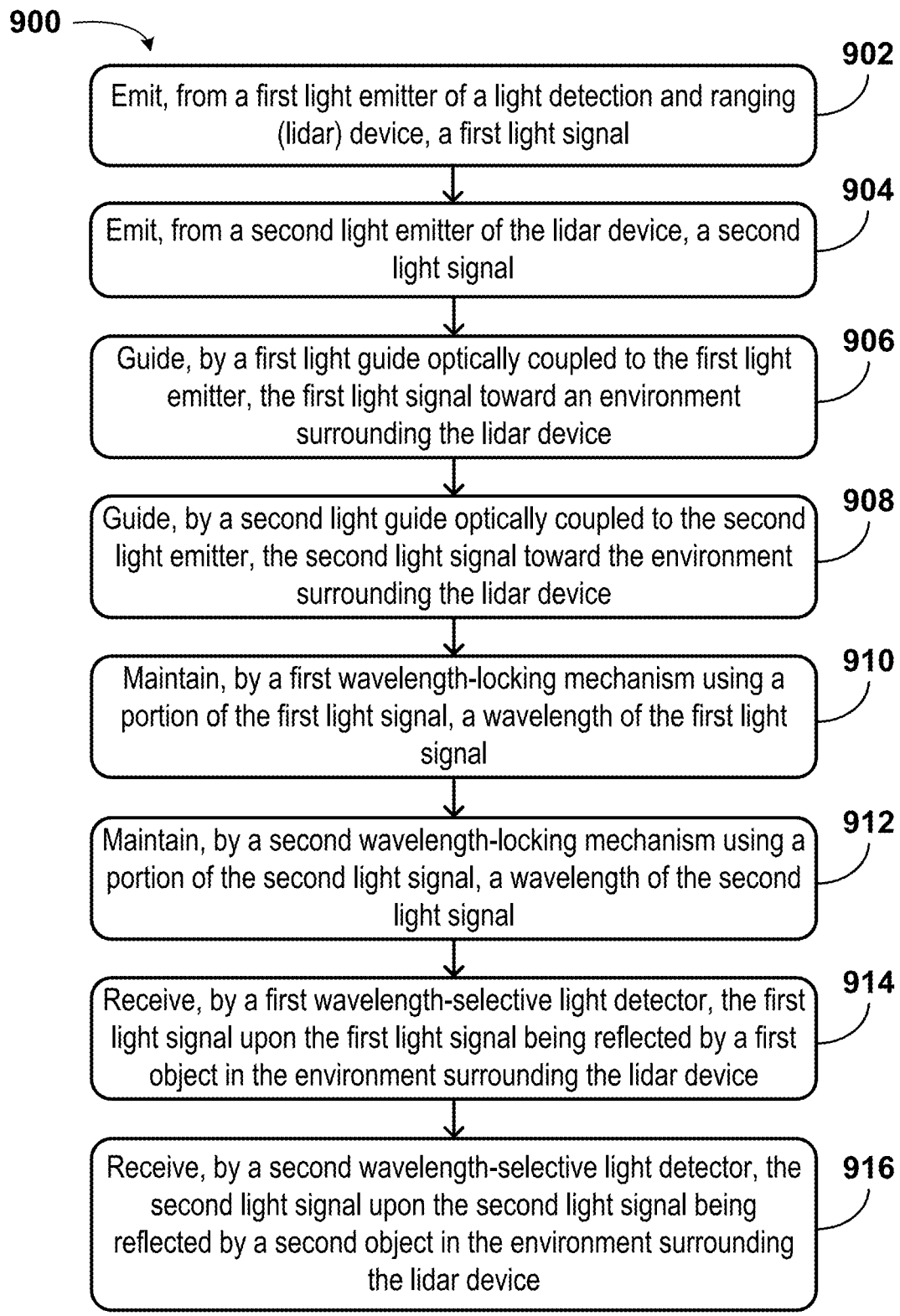
FIG. 9 is a flow-chart illustration of a method, according to example embodiments.

FIG. 9 is a flowchart diagram of a method 900, according to example embodiments. In some embodiments, one or more blocks of FIG. 9 may be performed by a lidar device (e.g., a lidar device used in the autonomous vehicle 100 to perform object detection and avoidance).

At block 902, the method 900 may include emitting, from a first light emitter of a light detection and ranging (lidar) device, a first light signal.

At block 904, the method 900 may include emitting, from a second light emitter of the lidar device, a second light signal.

At block 906, the method 900 may include guiding, by a first light guide optically coupled to the first light emitter, the first light signal toward an environment surrounding the lidar device.

At block 908, the method 900 may include guiding, by a second light guide optically coupled to the second light emitter, the second light signal toward the environment surrounding the lidar device.

At block 910, the method 900 may include maintaining, by a first wavelength-locking mechanism using a portion of the first light signal, a wavelength of the first light signal.

At block 912, the method 900 may include maintaining, by a second wavelength-locking mechanism using a portion of the second light signal, a wavelength of the second light signal. The wavelength of the first light signal and the wavelength of the second light signal may be different from one another.

At block 914, the method 900 may include receiving, by a first wavelength-selective light detector, the first light signal upon the first light signal being reflected by a first object in the environment surrounding the lidar device.

At block 916, the method 900 may include receiving, by a second wavelength-selective light detector, the second light signal upon the second light signal being reflected by a second object in the environment surrounding the lidar device. While the first object and the second object may represent disparate entities (e.g., a pedestrian and a tree), it is understood that the first object and the second object may be portions of the same entity in the environment. For example, the first object may correspond to a first portion of a vehicle (e.g., a car door) and the second object may correspond to a second portion of a vehicle (e.g., a headlight). Additionally, the first object and the second object may correspond to different regions of the same entity (e.g., the first object corresponds to a first location along a car door and the second object corresponds to a second location along the same car door).

In some embodiments of the method 900, in block 914, the first light signal may be received by the first wavelength-selective light detector upon the first light signal traveling through a first aperture defined within an aperture plate. Further, in block 914, the second light signal may be received by the second wavelength-selective light detector upon the second light signal traveling through a second aperture defined within the aperture plate.

In some embodiments of the method 900, the first wavelength-locking mechanism may include a first distributed Bragg reflector defined within the first light guide. Further, block 910 may include redirecting, by the first distributed Bragg reflector, the portion of the first light signal back toward the first light emitter. In addition, the second wavelength-locking mechanism may include a second distributed Bragg reflector defined within the second light guide. Still further, block 912 may include redirecting, by the second distributed Bragg reflector, the portion of the second light signal back toward the second light emitter.

In some embodiments of the method 900, the first wavelength-locking mechanism may include a first volume Bragg grating. Further, block 910 may include redirecting, by the first volume Bragg grating, the portion of the first light signal back toward the first light emitter. In addition, the second wavelength-locking mechanism may include a second volume Bragg grating. Still further, block 912 may include redirecting, by the second volume Bragg grating, the portion of the second light signal back toward the second light emitter.

Additionally, in some embodiments, the first volume Bragg grating may be optically positioned between the first light emitter and the first light guide. Yet further, the second volume Bragg grating may be optically positioned between the second light emitter and the second light guide.

In some embodiments of the method 900, the first wavelength-locking mechanism may include a first dye or a first quantum-dot material within the first light guide. Further, the second wavelength-locking mechanism may include a second dye or a second quantum-dot material within the second light guide.

In some embodiments of the method 900, the first wavelength-locking mechanism may include a first optical filter positioned at an end of the first light guide opposite an end at which the first light emitter is positioned. Further, the second wavelength-locking mechanism may include a second optical filter positioned at an end of the second light guide opposite an end at which the second light emitter is positioned.

Figure 10:
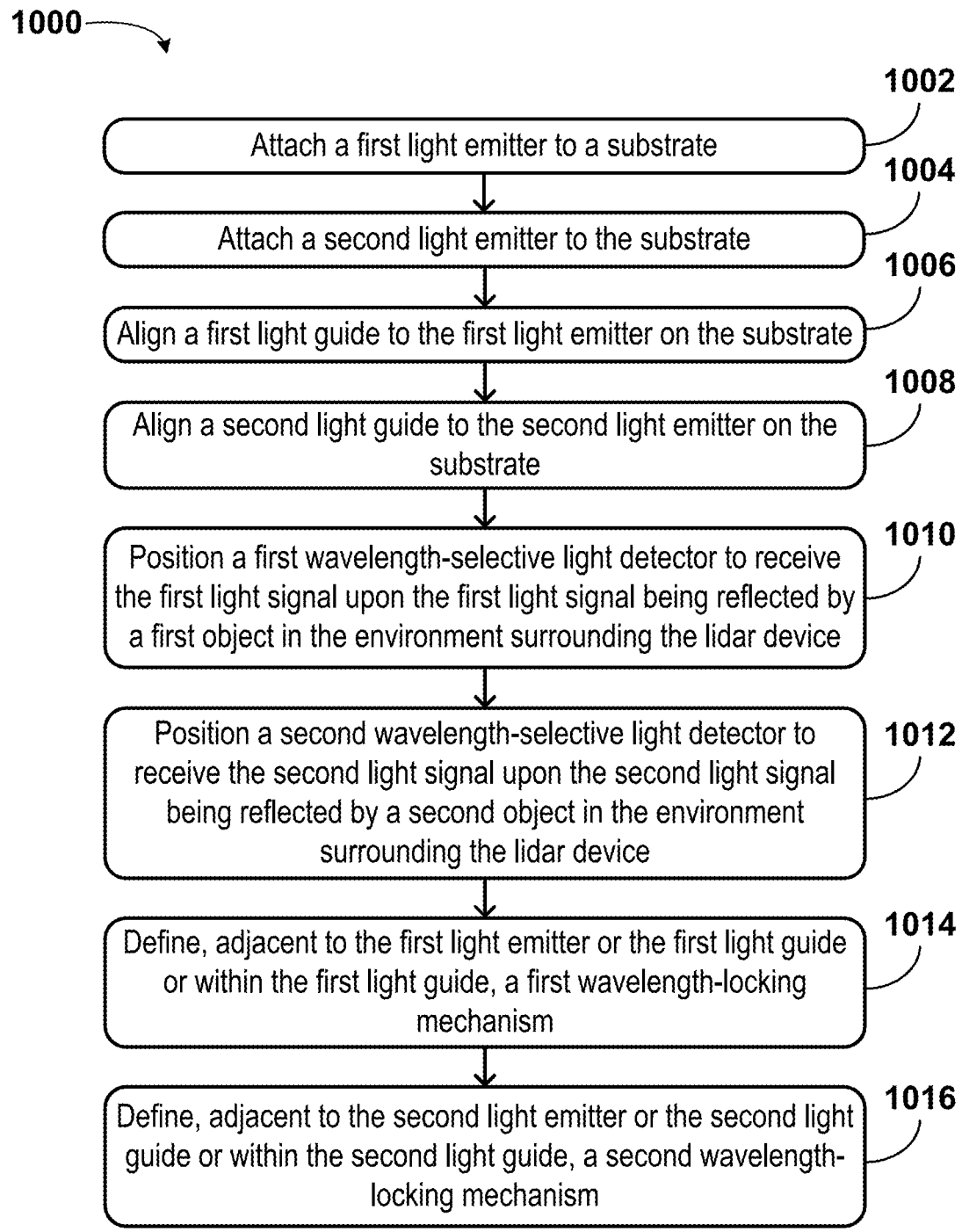
FIG. 10 is a flow-chart illustration of a method, according to example embodiments.

FIG. 10 is a flowchart diagram of a method 1000, according to example embodiments. In some embodiments, one or more blocks of FIG. 1000 may be performed to manufacture a light detection and ranging (lidar) device (e.g., a lidar device used in the autonomous vehicle 100 to perform object detection and avoidance).

At block 1002, the method 1000 may include attaching a first light emitter to a substrate. The first light emitter may be configured to emit a first light signal.

At block 1004, the method 1000 may include attaching a second light emitter to the substrate. The second light emitter may be configured to emit a second light signal.

At block 1006, the method 1000 may include aligning a first light guide to the first light emitter on the substrate. The first light guide may be configured to guide the first light signal toward an environment surrounding the lidar device.

At block 1008, the method 1000 may include aligning a second light guide to the second light emitter on the substrate. The second light guide may be configured to guide the second light signal toward the environment surrounding the lidar device.

At block 1010, the method 1000 may include positioning a first wavelength-selective light detector to receive the first light signal upon the first light signal being reflected by a first object in the environment surrounding the lidar device.

At block 1012, the method 1000 may include positioning a second wavelength-selective light detector to receive the second light signal upon the second light signal being reflected by a second object in the environment surrounding the lidar device.

At block 1014, the method 1000 may include defining, adjacent to the first light emitter or the first light guide or within the first light guide, a first wavelength-locking mechanism. The first wavelength-locking mechanism may be configured to use a portion of the first light signal to maintain a wavelength of the first light signal.

At block 1016, the method 1000 may include defining, adjacent to the second light emitter or the second light guide or within the second light guide, a second wavelength-locking mechanism. The second wavelength-locking mechanism may be configured to use a portion of the second light signal to maintain a wavelength of the second light signal. The wavelength of the first light signal and the wavelength of the second light signal may be different from one another.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including random-access memory (RAM), a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A light detection and ranging (lidar) device comprising:
a first light emitter configured to emit a first light signal;
a second light emitter configured to emit a second light signal;
a transparent substrate;
a first light guide disposed on the transparent substrate, wherein the first light guide is optically coupled to the first light emitter and configured to guide the first light signal from a first input end to a first output end, wherein the first output end comprises a first angled portion configured to direct the first light signal through the transparent substrate and toward an environment surrounding the lidar device;

a second light guide disposed on the transparent substrate, wherein the second light guide is optically coupled to the second light emitter and configured to guide the second light signal from a second input end to a second output end, wherein the second output end comprises a second angled portion configured to direct the second light signal through the transparent substrate and toward the environment surrounding the lidar device;

a first light detector positioned to receive the first light signal upon the first light signal being reflected by a first object in the environment surrounding the lidar device;

a second light detector positioned to receive the second light signal upon the second light signal being reflected by a second object in the environment surrounding the lidar device;

a first wavelength-locking mechanism configured to use a portion of the first light signal to maintain a wavelength of the first light signal; and a second wavelength-locking mechanism configured to use a portion of the second light signal to maintain a wavelength of the second light signal, wherein the wavelength of the first light signal and the wavelength of the second light signal are different from one another.

2. The lidar device of claim 1, further comprising an aperture structure having a first aperture and a second aperture defined therein, wherein the first light detector is positioned to receive the first light signal, wherein the first light signal is reflected by the first object in the environment surrounding the lidar device and travels through the first aperture, wherein the second light detector is positioned to receive the second light signal, and wherein the second light signal is reflected by the second object in the environment surrounding the lidar device and travels through the second aperture.

3. The lidar device of claim 1, wherein the first wavelength-locking mechanism comprises a first distributed Bragg reflector defined within the first light guide that redirects the portion of the first light signal back toward the first light emitter, and wherein the second wavelength-locking mechanism comprises a second distributed Bragg reflector defined within the second light guide that redirects the portion of the second light signal back toward the second light emitter.

4. The lidar device of claim 3, wherein the first distributed Bragg reflector defined within the first light guide is positioned closer to the first input end than to the first output end, and wherein the second distributed Bragg reflector defined within the second light guide is poisitioned closer to the second input end than to the second output end.

5. The lidar device of claim 1, wherein the first wavelength-locking mechanism comprises a first volume Bragg grating that redirects the portion of the first light signal back toward the first light emitter, and wherein the second wavelength-locking mechanism comprises a second volume Bragg grating that redirects the portion of the second light signal back toward the second light emitter.

6. The lidar device of claim 5, wherein the first volume Bragg grating is optically positioned between the first light emitter and the first light guide, and wherein the second volume Bragg grating is optically positioned between the second light emitter and the second light guide.

7. The lidar device of claim 5, wherein the first volume Bragg grating is embedded within the transparent substrate, and wherein the second volume Bragg grating is embedded within the transparent substrate.

8. The lidar device of claim 1, wherein the first wavelength-locking mechanism comprises a first dye or a first quantum-dot material within the first light guide, and wherein the second wavelength-locking mechanism comprises a second dye or a second quantum-dot material within the second light guide.

9. The lidar device of claim 1, wherein the first wavelength-locking mechanism comprises a first optical filter positioned at the first output end of the first light guide, and wherein the second wavelength-locking mechanism comprises a second optical filter positioned at the second output end of the second light guide.

10. The lidar device of claim 1, wherein the first wavelength-locking mechanism is a first portion of a chirped volume Bragg grating, and wherein the second wavelength-locking mechanism is a second portion of the chirped volume Bragg grating.

11. The lidar device of claim 1, wherein the first wavelength-locking mechanism reduces a temperature-dependency of the wavelength of the first light signal, and wherein the second wavelength-locking mechanism reduces a temperature-dependency of the wavelength of the second light signal.

12. A method comprising:
emitting, from a first light emitter of a light detection and ranging (lidar) device, a first light signal;
emitting, from a second light emitter of the lidar device, a second light signal;
guiding, by a first light guide disposed on a transparent substrate and optically coupled to the first light emitter, the first light signal from a first input end to a first output end, wherein the first output end comprises a first angled portion configured to direct the first light signal through the transparent substrate toward an environment surrounding the lidar device;
guiding, by a second light guide disposed on the transparent substrate and optically coupled to the second light emitter, the second light signal from a second input end to a second output end, wherein the second output end comprises a second angled portion configured to direct the second light signal through the transparent substrate and toward the environment surrounding the lidar device;
maintaining, by a first wavelength-locking mechanism using a portion of the first light signal, a wavelength of the first light signal;
maintaining, by a second wavelength-locking mechanism using a portion of the second light signal, a wavelength of the second light signal, wherein the wavelength of the first light signal and the wavelength of the second light signal are different from one another;
receiving, by a first light detector, the first light signal upon the first light signal being reflected by a first object in the environment surrounding the lidar device; and
receiving, by a second light detector, the second light signal upon the second light signal being reflected by a second object in the environment surrounding the lidar device.

13. The method of claim 12, wherein the first light signal is received by the first light detector upon the first light signal traveling through a first aperture defined within an aperture plate, and wherein the second light signal is received by the second light detector upon the second light signal traveling through a second aperture defined within the aperture plate.

14. The method of claim 12, wherein the first wavelength-locking mechanism comprises a first distributed Bragg reflector defined within the first light guide, wherein maintaining the wavelength of the first light signal comprises redirecting, by the first distributed Bragg reflector, the portion of the first light signal back toward the first light emitter, wherein the second wavelength-locking mechanism comprises a second distributed Bragg reflector defined within the second light guide, and wherein maintaining the wavelength of the second light signal comprises redirecting, by the second distributed Bragg reflector, the portion of the second light signal back toward the second light emitter.

15. The method of claim 14, wherein the first distributed Bragg reflector defined within the first light guide is positioned closer to the first input end than to the first output end, and wherein the second distributted Bragg reflector defined within the second light guide is positioned closer to the second input end than to the second output end.

16. The method of claim 12, wherein the first wavelength-locking mechanism comprises a first volume Bragg grating, wherein maintaining the wavelength of the first light signal comprises redirecting, by the first volume Bragg grating, the portion of the first light signal back toward the first light emitter, wherein the second wavelength-locking mechanism comprises a second volume Bragg grating, and wherein maintaining the wavelength of the second light signal comprises redirecting, by the second volume Bragg grating, the portion of the second light signal back toward the second light emitter.

17. The method of claim 16, wherein the first volume Bragg grating is optically positioned between the first light emitter and the first light guide, and wherein the second volume Bragg grating is optically positioned between the second light emitter and the second light guide.

18. The method of claim 16, wherein the first volume Bragg grating is embedded within the transparent substrate, and wherein the second volum Bragg grating is embedded within the transparent substrate.

19. The method of claim 12, wherein the first wavelength-locking mechanism comprises a first dye or a first quantum-dot material within the first light guide, and wherein the second wavelength-locking mechanism comprises a second dye or a second quantum-dot material within the second light guide.

20. The method of claim 12, wherein the first wavelength-locking mechanism comprises a first optical filter positioned at the first output end of the first light guide, and wherein the second wavelength-locking mechanism comprises a second optical filter positioned at the second output end of the second light guide.

* * * * *